US011363288B2

(12) United States Patent
Chen et al.

(10) Patent No.: US 11,363,288 B2
(45) Date of Patent: Jun. 14, 2022

(54) MOTION VECTOR GENERATION FOR AFFINE MOTION MODEL FOR VIDEO CODING

(71) Applicant: QUALCOMM Incorporated, San Diego, CA (US)

(72) Inventors: Yi-Wen Chen, San Diego, CA (US); Wei-Jung Chien, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/818,526

(22) Filed: Mar. 13, 2020

(65) Prior Publication Data

US 2020/0213608 A1 Jul. 2, 2020

Related U.S. Application Data

(63) Continuation of application No. 15/857,379, filed on Dec. 28, 2017, now Pat. No. 10,681,370.

(60) Provisional application No. 62/440,292, filed on Dec. 29, 2016.

(51) Int. Cl.
H04N 19/176 (2014.01)
H04N 19/51 (2014.01)
H04N 19/513 (2014.01)
H04N 19/52 (2014.01)

(52) U.S. Cl.
CPC ........... *H04N 19/51* (2014.11); *H04N 19/176* (2014.11); *H04N 19/52* (2014.11)

(58) Field of Classification Search
CPC ...... H04N 19/52; H04N 19/176; H04N 19/46; H04N 19/51; H04N 19/513
See application file for complete search history.

(56) References Cited

U.S. PATENT DOCUMENTS

| 9,438,910 | B1 | 9/2016 | Han et al. | |
|---|---|---|---|---|
| 2009/0231446 | A1 | 9/2009 | Lin | |
| 2012/0294362 | A1* | 11/2012 | Sikora | H04N 19/573 375/240.14 |
| 2014/0003527 | A1* | 1/2014 | Tourapis | H04N 19/36 375/240.16 |

(Continued)

OTHER PUBLICATIONS

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages, please consider section 8.5.3.2.5 on pp. 124 and 125, section 8.5.3.2.6 on pp. 125-128, and section 8.5.3.2.7 on pp. 128 and 129.

(Continued)

*Primary Examiner* — Alison Slater
(74) *Attorney, Agent, or Firm* — Shumaker & Sieffert, P.A.

(57) ABSTRACT

Techniques are described to unify the motion vectors of sub-blocks of an affine block and the motion vector information that is stored and used as predictors for determining motion vectors for subsequent blocks. A video coder may determine that the motion vector for a sub-block is the same as the motion vector information that is used to determine motion vectors for subsequent blocks.

26 Claims, 17 Drawing Sheets

4-parameters Affine Model 6-parameters Affine Model

(56) References Cited

U.S. PATENT DOCUMENTS

| | | | |
|---|---|---|---|
| 2014/0049607 A1* | 2/2014 | Amon | H04N 19/537 348/43 |
| 2017/0006284 A1* | 1/2017 | Gokhale | H04N 19/124 |
| 2017/0214932 A1 | 7/2017 | Huang | |
| 2018/0192069 A1 | 7/2018 | Chen et al. | |
| 2019/0082191 A1* | 3/2019 | Chuang | H04N 19/176 |
| 2020/0260111 A1* | 8/2020 | Liu | H04N 19/46 |

OTHER PUBLICATIONS

Bross B., et al., "Inter-Picture Prediction in HEVC", In: "High Efficiency Video Coding (HEVC)", Jun. 26, 2014 (Jun. 26, 2014), Springer International Publishing, XP055381060, ISBN: 978-3-319-06894-7, pp. 113-140, DOI: 10.1007/978-3-319-06895-4_5.

Chen J., et al., "Algorithm Description of Joint Exploration Test Model 4", 4. JVET Meeting; Oct. 15, 2016-Oct. 21, 2016; Chengdu; (The Joint Video Exploration Team of ISO/IEC JTC1/SC29/WG11 and ITUT SG.16); URL: http://phenix.int-evry.fr/jvet/, No. JVET-D1001, Oct. 28, 2016 (Oct. 28, 2016), 38 Pages, XP030150460.

Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

International Search Report and Written Opinion—PCT/US2017/068999—ISA/EPO—dated Mar. 14, 2018.

"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Lin S., et al., "Affine Transform Prediction for Next Generation Video Coding", Huawei Technologies, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 2015, 10 Pages.

Lin J.-L., et al., "Motion Vector Coding in the HEVC Standard," IEEE Journal of Selected Topics in Signal Processing, vol. 7, No. 6, Dec. 2013, pp. 957-968.

Sullivan G.J., et al., "Overview of the High Efficiency Video Coding (HEVC) Standard", IEEE Transactions on Circuits and Systems for Video Technology, vol. 22, No. 12, Dec. 1, 2012 (Dec. 1, 2012), XP055388661, USA ISSN: 1051-8215, DOI: 10.1109/TCSVT.2012.2221191, pp. 1649-1668, p. 1662, Paragraph 3) Merge Mode.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Zou F., et al., "Improved Affine Motion Prediction," JVET Meeting; May 26-Jun. 1, 2016; Geneva; The Joint Video Exploration Team of ISO/IEC JTC1/SC29/WG11 and ITU-T SG.16, No. JVET-C0062, May 17, 2016, XP030150163, 5 pages.

Prosecution History from U.S. Appl. No. 15/857,379, dated Apr. 10, 2018 through Jan. 31, 2020, 91 pp.

* cited by examiner

MOTION VECTOR GENERATION FOR AFFINE MOTION MODEL FOR VIDEO CODING

This application is a continuation application of U.S. application Ser. No. 15/857,379, filed Dec. 28, 2017, which claims the benefit of U.S. Provisional Application No. 62/440,292 filed Dec. 29, 2016, the entire content of each of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes.

Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded.

Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes examples of techniques related to motion vector prediction and motion vector reconstruction for affine motion prediction mode. The techniques may be applied to any of the existing video codecs, such as HEVC (High Efficiency Video Coding), or be an efficient coding tool in any future video coding standard or standards. In affine prediction mode, a video coder (e.g., video encoder or video decoder) may determine motion vectors for sub-blocks within an affine block. Also, the video coder may later use motion information for the sub-blocks as motion vector predictors for determining a motion vector for a subsequent block. In one or more examples, the video coder may be configured to unify the motion vectors for the sub-blocks and the motion vector predictors that correspond to the sub-blocks. For instance, the video coder may determine that the motion vectors for the sub-blocks are the same as the motion vector predictors for the sub-blocks.

In one example, the disclosure describes a method of decoding video data, the method comprising determining motion vectors for sub-blocks of an affine block, the motion vectors for the sub-blocks being a motion compensation prediction (MCP) motion vector field (MVF) for the sub-blocks, determining motion vector predictors (MVPs) corresponding to respective sub-blocks, wherein determining the MVPs includes determining that MVPs corresponding to respective corner sub-blocks of the affine block are the same as motion vectors for the respective corner sub-blocks, inter-prediction decoding the affine block, as part of MCP, based on the motion vectors that form the MVF for the sub-blocks of the affine block including the corner sub-blocks, and inter-prediction decoding a subsequent block based in part on the determined MVPs.

In one example, the disclosure describes a method of encoding video data, the method comprising determining motion vectors for sub-blocks of an affine block, the motion vectors for the sub-blocks being a motion compensation prediction (MCP) motion vector field (MVF) for the sub-blocks, determining motion vector predictors (MVPs) corresponding to respective sub-blocks, wherein determining the MVPs includes determining that MVPs corresponding to respective corner sub-blocks of the affine block are the same as motion vectors for the respective corner sub-blocks, inter-prediction encoding the affine block, as part of MCP, based on the motion vectors that form the MVF for the sub-blocks of the affine block including the corner sub-blocks, and inter-prediction encoding a subsequent block based in part on the determined MVPs.

In one example, the disclosure describes a device for coding video data, the device comprising a video data memory, and a video coder comprising at least one of fixed-function or programmable circuitry. The video coder is configured to determine motion vectors for sub-blocks of an affine block, the motion vectors for the sub-blocks being a motion compensation prediction (MCP) motion vector field (MVF) for the sub-blocks, determine motion vector predictors (MVPs) corresponding to respective sub-blocks, wherein to determine the MVPs, the video coder is configured to determine that MVPs corresponding to respective corner sub-blocks of the affine block are the same as motion vectors for the respective corner sub-blocks, store the MVPs in the video data memory, inter-prediction code the affine block, as part of MCP, based on the motion vectors that form the MVF for the sub-blocks of the affine block including the corner sub-blocks, and inter-prediction code a subsequent block based in part on the determined MVPs.

In one example, the disclosure describes a computer-readable storage medium storing instructions that when executed cause one or more processors to determine motion vectors for sub-blocks of an affine block, the motion vectors for the sub-blocks being a motion compensation prediction (MCP) motion vector field (MVF) for the sub-blocks, determine motion vector predictors (MVPs) corresponding to respective sub-blocks, wherein determining the MVPs includes determining that MVPs corresponding to respective corner sub-blocks of the affine block are the same as motion vectors for the respective corner sub-blocks, inter-prediction code the affine block, as part of the MCP, based on the motion vectors that form the MVF for the sub-blocks of the affine block including the corner sub-blocks, and inter-prediction code a subsequent block based in part on the determined MVPs.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

The example techniques described in this disclosure are related to affine mode coding. In affine mode, an affine block includes a plurality of sub-blocks with their own motion vectors, such that the motion vectors of the sub-blocks form a motion vector field (MVF) used for motion compensation prediction (MCP). A video coder (e.g., video encoder or video decoder) may determine the motion vectors for the sub-blocks based on motion vectors for control points of the affine block.

These same sub-blocks may be used as part of advanced motion vector prediction (AMVP) or merge mode for the inter-prediction of a subsequent block. For example, a video coder may use the motion information of a sub-block of the affine block to determine a motion vector of a subsequent block that is predicted in AMVP or merge mode.

However, there may be certain technical problems in some existing techniques where a sub-block of the affine block is used as part of AMVP or merge mode for a subsequent block. For the corner sub-blocks of an affine block (e.g., blocks on the top-left, top-right, bottom-left, and bottom-right), some conventional techniques store the motion vectors of the control points as the motion information that is used to determine a motion vector for a subsequent block. These conventional techniques may not have stored, for the corner sub-blocks, interpolated motion vectors as the motion information that is used to determine the motion vector for a subsequent block.

In this disclosure, the term motion vector predictor (MVP) for corresponding sub-block refers to the motion vector information that is stored for a corresponding sub-block that is used as a MVP for a subsequent block. This motion vector information is then used as a predictor to determine a motion vector for a subsequent block. The MVP corresponding to a sub-block does not necessarily mean, although it is possible it could mean, the predictor with which the motion vector for the sub-block is determined. Rather, it is the motion vector that is used to determine the motion vector of a subsequent block.

Existing techniques may waste computational resources by separating out the motion vectors for the sub-blocks and their MVPs. For instance, with such an existing technique, the video coder may have determined the motion vectors for corner sub-blocks, but then discards this information, and instead stores motion vectors for the control points as the MVPs for the corner sub-blocks.

This disclosure describes techniques for unifying the motion vectors for the sub-blocks and the corresponding MVPs. For example, rather than the video coder keeping separate motion vectors and MVPs, this disclosure describes example techniques where the motion vectors for the sub-blocks and the MVPs for the sub-blocks are the same.

Figure 1:
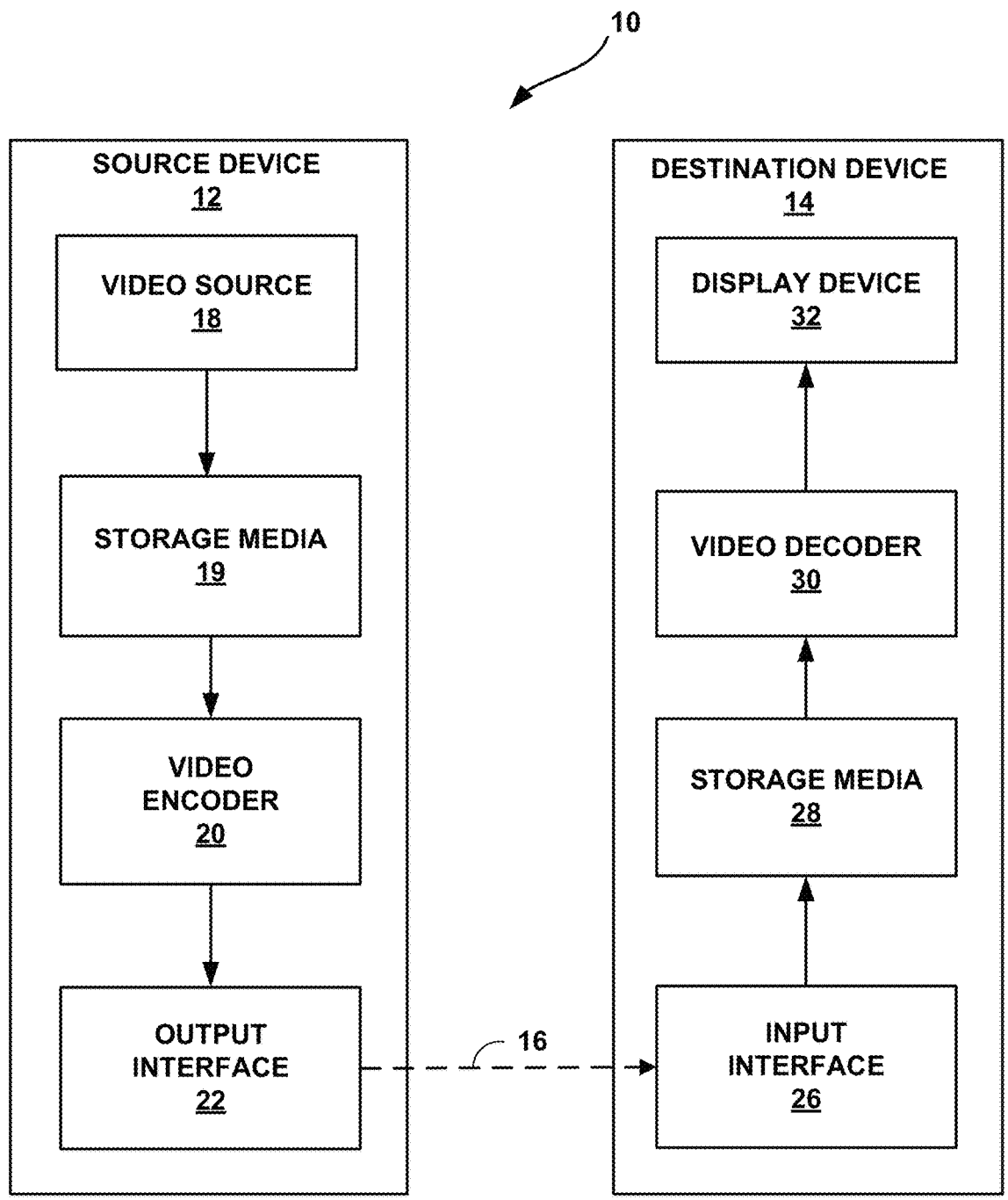
FIG. 1 is a block diagram illustrating an example video encoding and decoding system that may utilize one or more techniques described in this disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general, and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), encoding of digital video onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, and High Efficiency Video Coding (HEVC), i.e., ITU-T H.265, including its range and screen content coding extensions, 3D video coding (3D-HEVC) and multiview extensions (MV-HEVC) and scalable extension (SHVC), developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC standard is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2015.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 3 (JEM 3) could be downloaded from: https://jvet.hhi.fraunhofer.de/svn/svn_HMJEMSoftware/tags/HM-16.6-JEM-3.0/. A document, J. Chen, E. Alshina, G. J. Sullivan, J.-R. Ohm, J. Boyce, "Algorithm Description of Joint Exploration Test Model 3", JVET-C1001, May, 2016 (hereinafter, "JVET-C1001"), and includes an algorithm description of Joint Exploration Test Model 3 (JEM3).

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted SL, SCb, and Scr. SL is a two-dimensional array (i.e., a block) of luma samples. SCb is a two-dimensional array of Cb chroma samples. SCr is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements presented together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

In HEVC and particular other codecs, video encoder 20 encodes a CU using only one prediction mode (i.e., intra prediction or inter prediction). Thus, in HEVC and particular other codecs, video encoder 20 may generate predictive blocks of a CU using intra prediction or video encoder 20 may generate predictive blocks of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N×N, PART_N×2N, PART_N×N, PART_2N×nU, PART_2N×nD, PART_nL×2N and PART_nR×2N. When a CU is intra predicted, 2N×2N and N×N are the only permissible PU shapes, and within each PU a single intra prediction mode is coded (while chroma prediction mode is signalled at CU level).

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. In some examples, the one or more transforms convert the transform block from a pixel domain to a frequency domain. Thus, in such examples, a transform coefficient may be considered to be in a frequency domain.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, in HEVC, the largest coding unit in a slice is called a coding tree block (CTB) or coding tree unit (CTU). A CTB contains a quad-tree the nodes of which are coding units. The size of a CTB can range from 16×16 to 64×64 in the HEVC main profile (although technically 8×8 CTB sizes can be supported). Although described with respect to HEVC, the example techniques may be applied to other video coding standards, including new video standards under development such as the H.266 video coding standard. A coding unit (CU) could be the same size of a CTB although and as small as 8×8. Each coding unit is coded with one mode. When a CU is inter coded, the CU may be further partitioned into 2 or 4 prediction units (PUs) or become one PU when further partition does not apply. When two PUs are present in one CU, the PUs can be half size rectangles or two rectangle sized with ¼ or ¾ size of the CU. When the CU is inter coded, one set of motion information is present for each PU. In addition, each PU is coded with a unique inter-prediction mode to derive the set of motion information.

In the HEVC standard, as an example, there are two inter prediction modes, named merge (skip is considered as a special case of merge) and advanced motion vector prediction (AMVP) modes respectively for a PU. In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 2A:
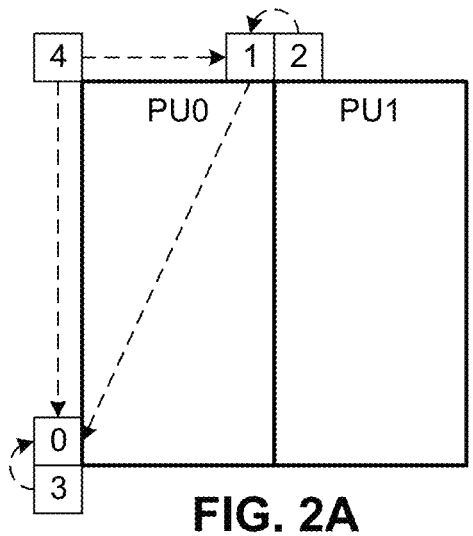
FIG. 2A illustrates spatial neighboring motion vector (MV) candidates for merge mode.
Figure 2B:
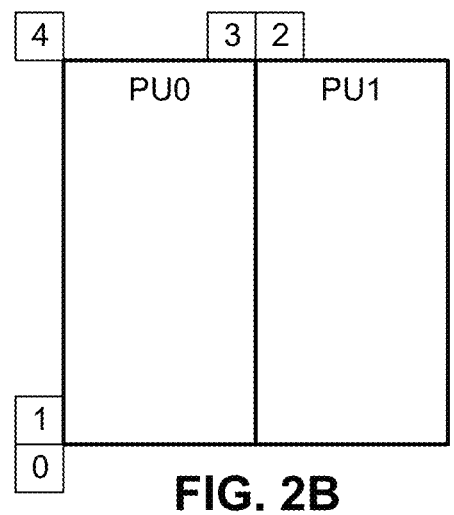
FIG. 2B illustrates spatial neighboring MV candidates for Advanced Motion Vector Prediction (AMVP) mode.

Spatial MV candidates are derived from the neighboring blocks shown on FIG. 2A and FIG. 2B, for a specific PU ($PU_0$), although the methods for generating the candidates from the blocks differ for merge and AMVP modes. In merge mode, up to four spatial MV candidates can be derived with the orders shown in FIG. 2A with numbers, and the order is the following: left (0, A1), above (1, B1), above right (2, B0), below left (3, A0), and above left (4, B2), as shown in FIG. 2A.

In AMVP mode, the neighboring blocks are divided into two groups: left group consisting of the block 0 and 1, and above group consisting of the blocks 2, 3, and 4 as shown in FIG. 2B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate; thus the temporal distance differences can be compensated.

Temporal motion vector predictor (TMVP) candidate, if enabled and available, is added into the MV candidate list after spatial motion vector candidates. The process of motion vector derivation for TMVP candidate is the same for both merge and AMVP modes; however, the target reference index for the TMVP candidate in the merge mode may be always set to 0.

Figure 3B:
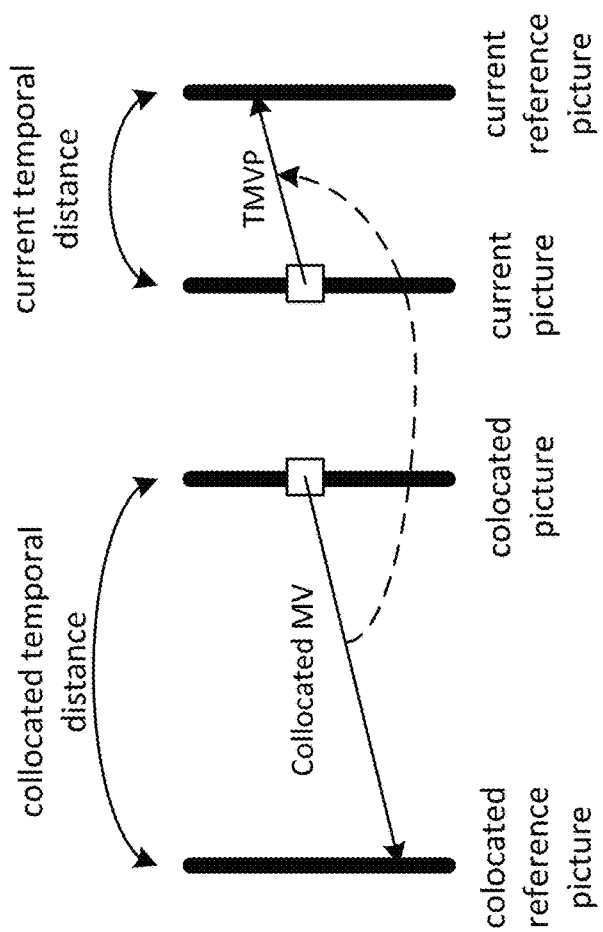
FIG. 3B illustrates motion vector scaling.
Figure 3A:
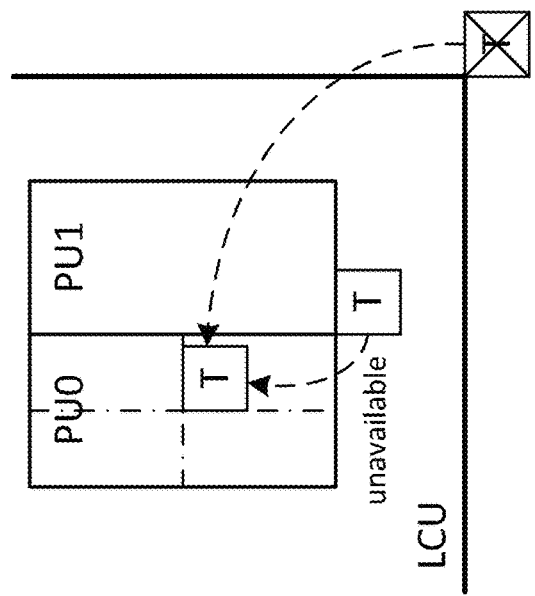
FIG. 3A illustrates a temporal motion vector predictor (TMVP) candidate.

The primary block location for TMVP candidate derivation is the bottom right block outside of the collocated PU as shown in FIG. 3A as a block "T," to compensate the bias to the above and left blocks used to generate spatial neighboring candidates. However, if that block is located outside of the current CTB row or motion information is not available, the block is substituted with a center block of the PU.

A motion vector for a TMVP candidate is derived from the co-located PU of the co-located picture, indicated in the slice level. The motion vector for the co-located PU is called a collocated MV. Similar to temporal direct mode in AVC, to derive the TMVP candidate motion vector, the co-located MV may be scaled to compensate the temporal distance differences, as shown in FIG. 3B.

Several aspects of merge and AMVP modes include the following.

Motion Vector Scaling:

It is assumed that the value of motion vectors is proportional to the distance of pictures in the presentation time. A motion vector associates two pictures, the reference picture, and the picture containing the motion vector (namely the containing picture). When a motion vector is used to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector candidate list is not complete, artificial motion vector candidates are generated and inserted at the end of the list until it will have all candidates. In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Pruning Process for Candidate Insertion:

Candidates from different blocks may happen to be the same, which decreases the efficiency of a merge/AMVP candidate list. A pruning process is applied to solve this problem. The pruning process compares one candidate against the others in the current candidate list to avoid inserting identical candidates at least to a certain extent. To reduce the complexity, only limited numbers of pruning processes are applied instead of comparing each potential one with all of the other existing ones.

In HEVC, only a translation motion model is applied for motion compensation prediction (MCP). In the real world, however, there are many kinds of motions, e.g. zoom in/out, rotation, perspective motions and the other irregular motions. In JEM, a simplified affine transform motion compensation prediction is applied to improve the coding efficiency. If a block follows the affine motion model, the MV of position (x, y) in the block can be determined by the affine motion model, where a, b, c d, e, and f are affine parameters:

$$\begin{cases} v_x = ax + by + c \\ v_y = dx + ey + f \end{cases} \quad (1)$$

Figure 4:
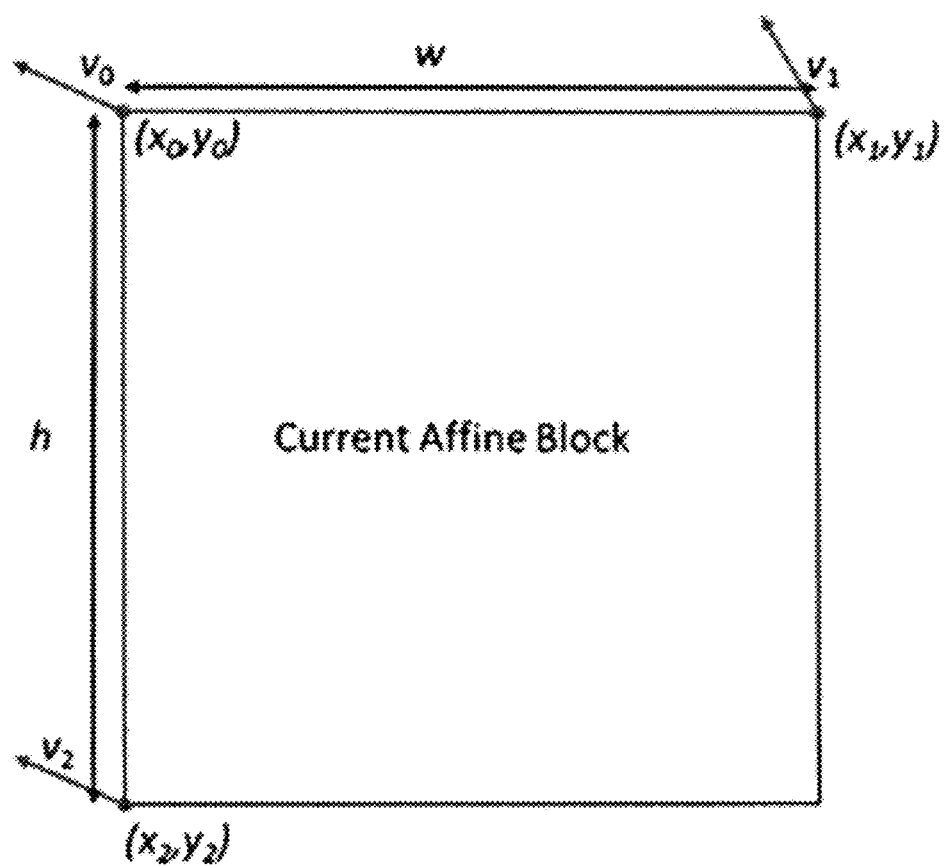
FIG. 4 illustrates a simplified affine motion model.

As illustrated in FIG. 4, the 6-parameters affine motion model can be represented by the motion vector $v_0$ of the top-left control point $(x_0, y_0)$, the motion vector $v_1$ of the top-right control point $(x_1, y_1)$ and the motion vector $v_2$ of the top-right control point $(x_2, y_2)$. With the assumption that the top-left control point is the origin of the coordinate system, which means $(x_0, y_0)=(0, 0)$, the MV of position (x, y) in the block is described by the following equation:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (2)$$

where $(v_{0x}, v_{0y})$ is a motion vector of the top-left corner control point, $(v_{1x}, v_{1y})$ is a motion vector of the top-right corner control point, $(v_{2x}, v_{2y})$ is a motion vector of the bottom-left corner control point, $w=(x_1-x_0)$ is the horizontal distance between the top-left and top-right control points, and $h=(y_2-y_0)$ is the vertical distance between the top-left and bottom-left control points.

However, in JEM 3.0, the affine motion model is simplified to a 4-parameters affine motion model by assuming a=e and b=−d in equation (1):

$$\begin{cases} v_x = ax - by + c \\ v_y = bx + ay + f \end{cases} \quad (3)$$

Figure 5:
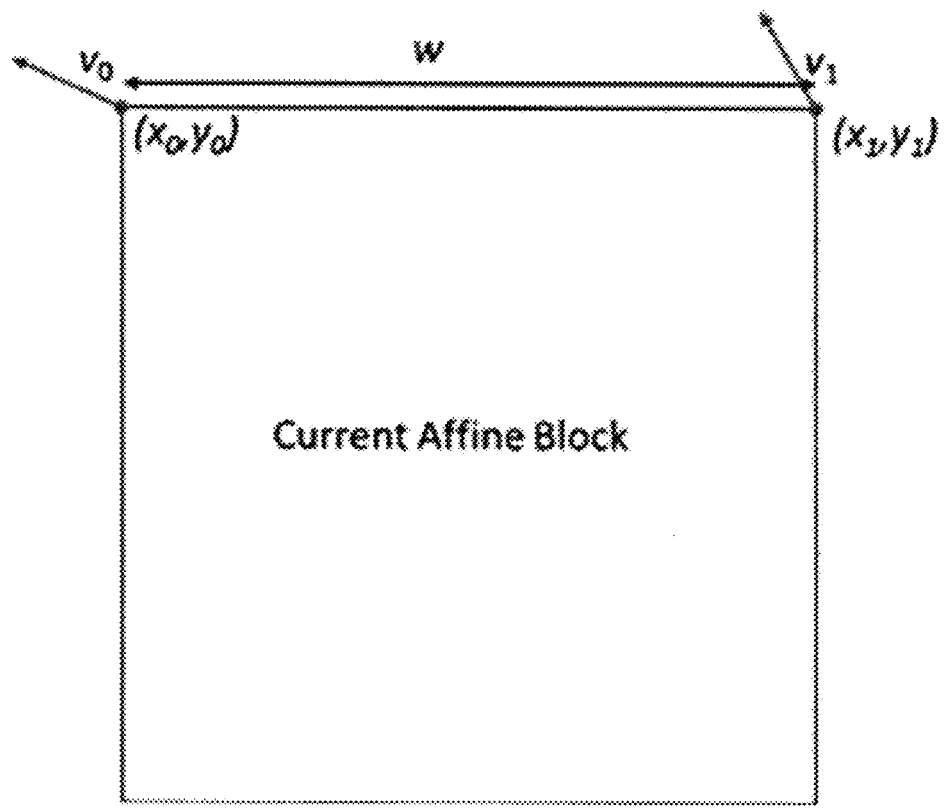
FIG. 5 illustrates another simplified affine motion model.

The 4-parameters affine motion model is then represented by the motion vector $v_0$ of the top-left control point $(x_0, y_0)$ which is assumed as the origin point and the motion vector $v_1$ of the top-right control point $(x_1, y_1)$. As shown in FIG. 5, the affine motion field of the block is described by two control point motion vectors. The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (4)$$

where $(v_{0x}, v_{0y})$ is a motion vector of the top-left corner control point, $(v_{1x}, v_{1y})$ is a motion vector of the top-right corner control point and w $(x_1-x_0)$ is the horizontal distance between the top-left and top-right control points.

Figure 6:
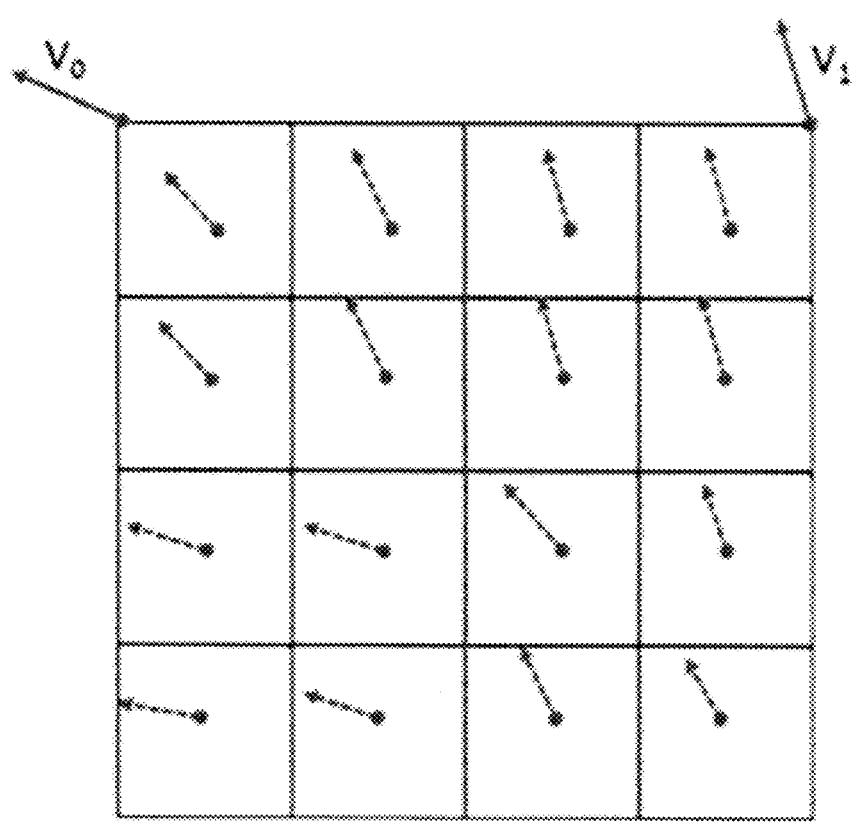
FIG. 6 illustrates a motion compensation prediction (MCP) motion vector (MV) field.

In order to further simplify the motion compensation prediction, block based affine transform prediction is applied. To derive motion vector of each 4×4 sub-block, the motion vector of the center sample of each sub-block, as shown in FIG. 6, is calculated according to equation (4), and rounded to 1/16 fraction accuracy. Then, the motion compensation interpolation filters are applied to generate the prediction of each sub-block with derived motion vector. The interpolated motion vectors for each sub-block within the affine block is named as a MCP motion vector field (MVF) in the following context. The sub-block size can vary depending on the MV difference between control points. For example, in FIG. 6, the MV of each sub-block (e.g., 4×4 block) is interpolated by the MVs of the control points. The MV is then used to perform motion compensation prediction (MCP) for each sub-block.

Figure 7:
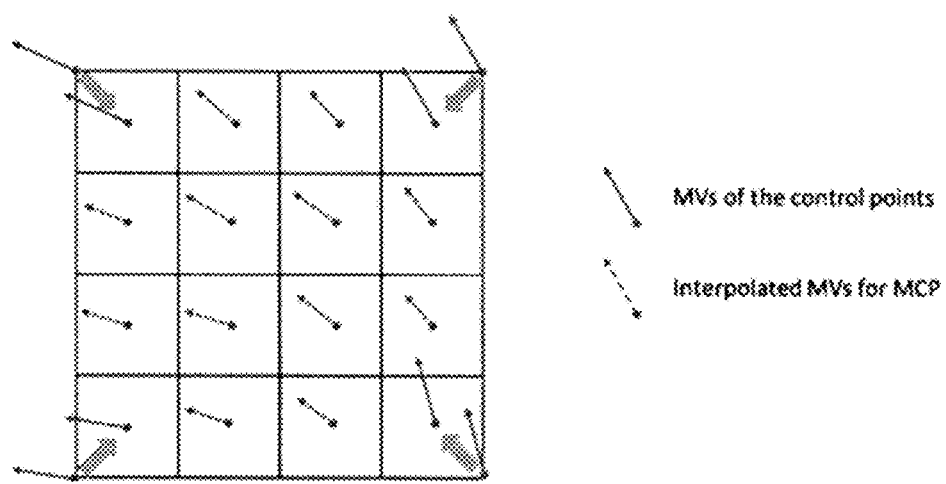
FIG. 7 illustrates a stored MV field.

After MCP, the high accuracy motion vector of each sub-block is rounded and saved as the same accuracy as the normal motion vector. In JEM and HEVC, the motion vectors for each inter prediction CU or PU are stored for the MV prediction of the other inter blocks. The store unit for motion vectors is a 4×4 block. In JEM, the interpolated MVs of an affine block are generated and stored for each 4×4 block. However, since the MVs of the control points may be used for the following blocks, as shown in FIG. 7, the stored MVs for the corner 4×4 blocks are the MVs of the control points instead of the associated MVs used for MCP. In current JEM, the MVs of the bottom-left and bottom-right control points are also generated by the MVs of the top-left and top-right control points. For example, in FIG. 7, the MV of each sub-block (e.g., 4×4 block) is interpolated by the MVs of the control points. The stored MV of the four corner sub-blocks are the MVs of the nearby control points.

In some cases, as illustrated by FIGS. 6 and 7, the motion vector for a sub-block, and the motion information corresponding to that sub-block when used as a predictor is different. As an example, FIG. 6 illustrates a motion vector for the top-left corner sub-block. However, as illustrated in FIG. 7, the motion information that is stored for the top-left corner sub-block is not the motion vector illustrated in FIG. 6, but is instead the motion information for the $v_0$ motion vector for the top-left control point. The same occurs for the bottom-left, top-right, and bottom-right corner sub-blocks.

If one of these corner sub-blocks were used as part of AMVP or merge mode for another block (e.g., in the same picture or in a different picture), then the motion vector for this other block would be based on the motion vectors for the control points, and not based on the motion vectors determined for the sub-block. As an example, assume that as part of merge mode or AMVP, a video coder (e.g., video encoder 20 and video decoder 30) constructed a candidate list including the motion information for the top-right sub-block of the affine block of FIG. 6. In this example, the video coder may not include the motion information for the motion vector shown in FIG. 6. Rather, the video coder may include the motion vector of the top-right control point, as illustrated in FIG. 7.

Accordingly, in some of these techniques, there is not unification between the motion information of motion vectors used for motion compensation (e.g., example of FIG. 6) and motion information of motion vectors used as predictors (e.g., example of FIG. 7). This disclosure describes example techniques to unify the determined motion vector for the sub-blocks of an affine block and the motion information that is used for the sub-blocks when the motion information is used as a predictor for a subsequent block being encoded or decoded.

In this disclosure, the motion vector predictors (MVPs) corresponding to respective sub-blocks is referring to the stored motion vector information that would be used for a sub-block when the motion vector information for that sub-block is used as a predictor for determining a motion vector for a subsequent block. As an example, FIG. 6 illustrates the motion vectors for the sub-blocks, and FIG. 7 illustrates the MVPs corresponding to respective sub-blocks. In some techniques, the motion vectors for the sub-blocks and the MVPs corresponding to the sub-blocks may be different (e.g., not unified). This disclosure describes example techniques to unify the motion vectors for the sub-blocks and the MVPs corresponding to the sub-blocks. The MVPs corresponding to the sub-blocks may be used when the subsequent block is being inter-prediction encoded or decoded in AMVP or merge mode. Again, the MVPs corresponding to the sub-blocks are not predictors for determining the motion vector for the sub-blocks, but are rather the motion vector information that is stored and used as a predictor to determine the motion vector for a subsequent block.

Figure 8:
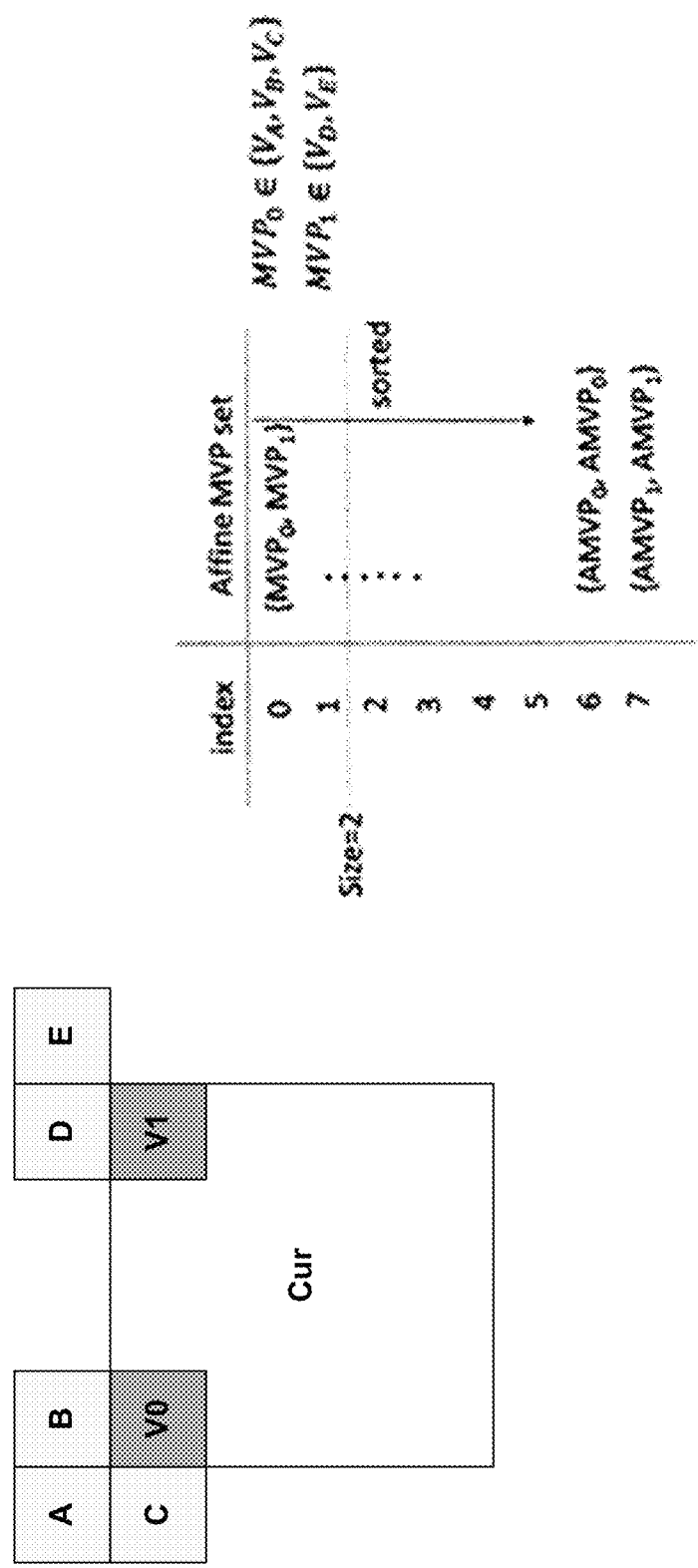
FIG. 8 illustrates an MVF for AF_INTER.

In JEM, there are two affine motion modes: AF_INTER mode and AF_MERGE mode. For CUs with both width and height larger than 8, AF_INTER mode can be applied. An affine flag is signaled at the CU level in the bitstream to indicate whether AF_INTER mode is used. In the AF_INTER mode, a candidate list with motion vector set $\{(MVP_0, MVP_1)|MVP_0=\{v_A, v_B, v_C\}, MVP_1=\{v_D,v_E\}\}$ is constructed using the neighbor blocks. As shown in FIG. 8, $MVP_0$ is selected from the motion vectors of the block A, B or C for AF_INTER.

The motion vector from the neighbor block is scaled according to the reference list and the relationship among the POC of the reference for the neighbor block, the POC of the reference for the current CU and the POC of the current CU. The approach to select $MVP_1$ from the neighbour block D and E may be similar. If the number of candidate list is smaller than 2, the list may be padded by the motion vector pair composed by duplicating each of the AMVP candidates $\{AMVP_0, AMVP_0\}$ and $\{AMVP_1, AMVP_1\}$. When the candidate list is larger than 2, the candidates are firstly sorted according to the consistency of the neighboring motion vectors (similarity of the two motion vectors in a pair candidate) and only the first two candidates are kept as shown in the right part of FIG. 8.

A rate-distortion (RD) cost check is used to determine which motion vector set candidate is selected as the control point motion vector prediction (CPMVP) of the current CU. An index indicating the position of the CPMVP in the candidate list is signaled in the bit stream. After the CPMVP of the current affine CU is determined, affine motion estimation is applied and the control point motion vector (CPMV) is found. Then, the difference of the CPMV and the CPMVP is signaled in the bitstream.

For example, as illustrated in FIG. 8, there are three neighboring blocks (A, B, and C) whose motion vectors could be used to determine the motion vector $v_0$ for the top-left control point, and two neighboring blocks (D and E) whose motion vectors could be used to determine the motion vector $v_1$ for the top-right control point. Therefore, there are six possible combinations to determine the motion vector $v_0$ and $v_1$: (A, D), (A, E), (B, D), (B, E), (C, D), and (C, E). Video encoder 20 and video decoder 30 may construct the affine motion vector predictor set with the six combinations, add two more choices by padding with AMPV candidates for a total of eight entries (e.g., 0-7 in FIG. 8), perform a sorting operation, and prune the list to two entries.

Figure 9B:
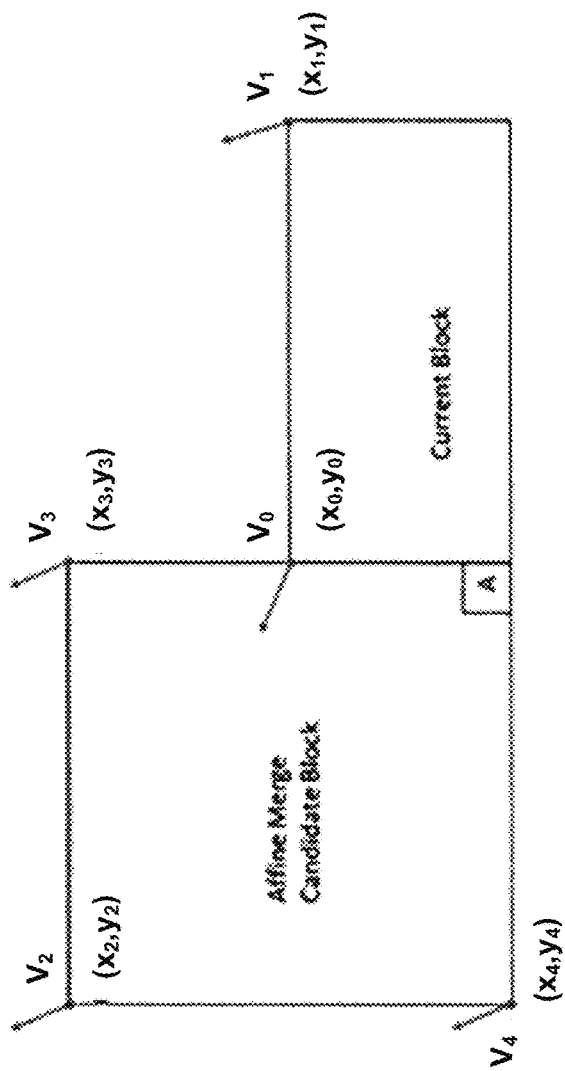
FIG. 9B illustrates candidates for AF_MERGE.
Figure 9A:
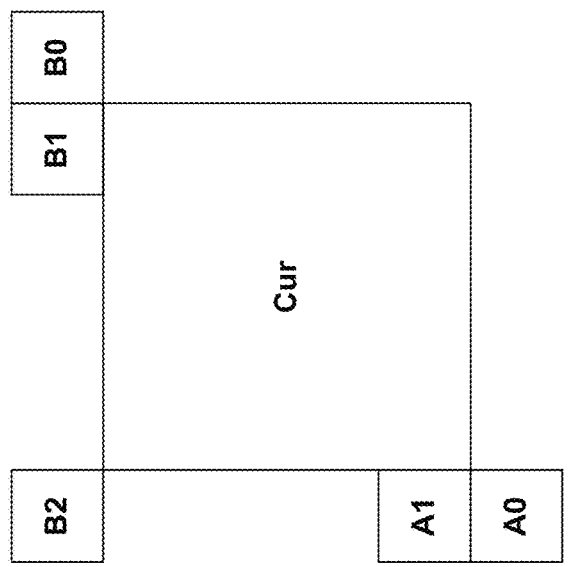
FIG. 9A illustrates candidates for AF_MERGE.

When a CU is applied in affine merge (AF_MERGE) mode, it gets the first block coded with affine mode from the valid neighbor reconstructed blocks based on the visiting order: A1 → B1 → B0 → A0 → B2. The selection order for the candidate block is → from left, above, above right, left bottom to above left as shown in FIG. 9A for AF_MERGE. If the neighbor left bottom block A is coded in affine mode as shown in FIG. 9B, the motion vectors $v_2$, $v_3$ and $v_4$ of the top left corner, above right corner and left bottom corner of the CU which contains the block A are derived. The motion vector $v_0$ of the top left corner on the current CU is extrapolated according to $v_2$, $v_3$ and $v_4$ using equation (5) by assuming $(x_2, y_2)$ is the origin point which means $(x_2, y_2)=(0, 0)$. The motion vector $v_1$ of the above right of the current CU is calculated in a similar way. The equation (5) is shown as follows.

$$\begin{cases} v_x = \frac{(v_{3x} - v_{2x})}{w} x + \frac{(v_{4x} - v_{2x})}{h} y + v_{2x} \\ v_y = \frac{(v_{3y} - v_{2y})}{w} x + \frac{(v_{4y} - v_{2y})}{h} y + v_{2y} \end{cases} \quad (5)$$

where $(v_{2x}, v_{2y})$ is the motion vector of the top-left corner control point $(x_2, y_2)$, $(v_{3x}, v_{3y})$ is motion vector of the top-right corner control point $(x_3, y_3)$, $(v_{4x}, v_{4y})$ is the motion vector of the bottom-left corner control point $(x_4, y_4)$ in the neighbor affine block, $w=(x_3-x_2)$ is the horizontal distance between the top-left and top-right control points, and $h=(y_4-y_2)$ is the vertical distance between the top-left and bottom-left control points.

After the CPMV of the current CU $v_0$ and $v_1$ are derived, according to the affine motion model equation (4), the MVF of the current CU is generated. In order to identify whether the current CU is coded with AF_MERGE mode, an affine flag is signaled in the bitstream when there is at least one neighbor block that is coded in affine mode.

Figure 10:
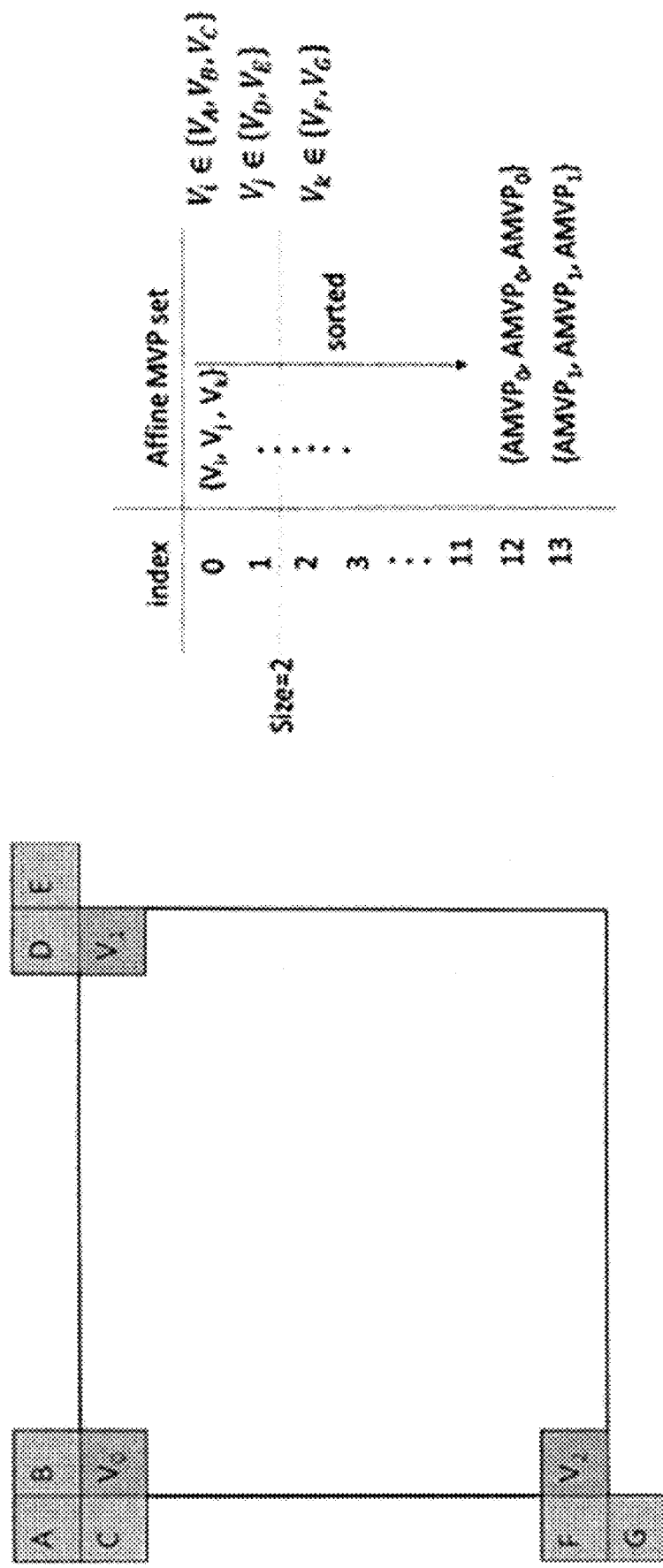
FIG. 10 illustrates a 6-parameter affine model.

In a document, Zou et al., "Improved affine motion prediction," JVET-C0062, May 2016 (hereinafter "JVET-C0062") available from http://phenix.it-sudparis.eu/jvet/doc_end user/documents/3_Geneva/wg11/JVET-C0062-v3.zip, it is proposed to adaptively select to use either 4-parameter affine motion model or 6-parameter affine motion model for each affine block in JEM. In 6-parameter affine model, there may be no constraint on the scaling factors between horizontal and vertical directions. Three corner motion vectors are used to represent the 6-parameter model. Given the motion vectors at the three corners (illustrated in FIG. 10), the MV of position (x, y) in the block is described by equation (2). Similar to the 4-parameter AF_INTER mode, a candidate list with motion vector set $\{(v_0, v_1, v_2)_0 = \{v_A, v_B, v_C\}, v_1 = \{v_D, v_E\}, v_2 = \{v_F, v_G\}\}$ for the 6-parameters AF_INTER mode is constructed using the neighbor blocks.

In general, the affine motion model is a 6-parameters motion model as shown in equation (1). In JEM-3.0, the affine motion model for a block is represented by the motion vectors of the control points $(v_0, v_1)$. In JVET-C0062 the affine motion model for a block can be further represented by the motion vectors of the control points $(v_0, v_1, v_2)$. However, it may be desirable to represent the affine motion model by signaling the parameters a, b, c, d, e, f in equation (1) or simplified 4 parameters. The affine motion model can also be further interpreted as equation (6) where $O_x$ and $O_y$ are the translation offsets, $S_x$ and $S_y$ are the scaling ratio in the x and y directions and $\theta_x$ and $\theta_y$ are the rotation angles.

$$\begin{cases} v_x = s_x * \cos\theta_x * x - s_y * \sin\theta_y * y + O_x \\ v_y = s_x * \sin\theta_x * x + s_y * \cos\theta_y * y + O_y \end{cases} \quad (6)$$

The above description of affine inter and affine merge are to assist with understanding how a video coder (e.g., video encoder 20 and video decoder 30) may determine the motion vectors for the control points. Once the motion vectors for the control points are determined, the video coder may utilize one or more example techniques described in this disclosure to determine the motion vectors for the sub-blocks and the MVPs for corresponding sub-blocks (e.g., the motion vector information used to determine a motion vector predictor for a subsequent block). In one or more examples, the motion vectors for the sub-blocks and the MVPs for corresponding sub-blocks may be unified so that the motion vectors for the sub-blocks and the MVPs for corresponding sub-blocks are the same.

For instance, the design of HEVC/JEM may have the following problems. As described above, for an affine block in JEM, the corner 4×4 blocks utilize the MVs interpolated by the control points to perform motion compensation prediction (MCP) (e.g., as illustrated in FIG. 6). However, since the MVs of the control points can be used for affine MV extrapolation of neighbor blocks, the stored MVs for the corner 4×4 blocks are the MVs of the nearby control points instead of the associated MVs used to perform MCP. For example, FIG. 7 illustrates that the stored motion vectors that are used as predictors for subsequent blocks are the motion vectors for the nearby control points for the corner sub-blocks, and not the interpolated motion vectors of the corner sub-blocks as illustrated in FIG. 6.

This disclosure describes techniques to align the MCP motion vector field (MVF) and the stored MVF for an affine block which is coded as affine inter mode and/or affine merge mode. The stored MVF refers to the motion vector information that is used as a predictor to determine motion vectors for subsequent blocks, and is another term for the MVPs of corresponding sub-blocks. For example, the MCP motion vector field (MVF) and stored MVF for an affine block are unified to one MVF. Moreover, the following methods to modify the affine motion vector field (MVF) generation may be applied individually. Alternatively, any combination of them may be applied together with the scheme of unified MVF.

The following describes MVF generation for affine inter mode. For example, the following describes a first example method of MVF generation. The unified MVF for an affine inter block is generated by calculating MVs for each sub-block within an affine block using the MVs of the control points of a current affine block by affine motion model (e.g. the equation (2), (4), (6) or any other representation of affine motion model). The unified MVF is used for both MCP and stored as the MVP for the following blocks.

For example, after the $v_0$, $v_1$ and $v_2$ (for 6-parameter affine) of a current affine block are reconstructed for the current affine inter block, the unified MVF for an affine merge block is generated by calculating MVs for each sub-block within the current affine block using affine motion model (e.g., equation (2), (4), or (6)).

As one example, video encoder 20 and video decoder 30 may determine motion vectors for a plurality of control points of an affine block. For example, video encoder 20 and video decoder 30 may determine the $v_0$, $v_1$, and $v_2$ motion vectors for the top-left, top-right, and bottom-left control points of the affine block, or determine the $v_0$ and $v_1$ motion vectors for the top-left and top-right control points of the affine block. Video encoder 20 and video decoder 30 may utilize the affine inter mode or affine merge mode to determine the motion vectors for the control points.

Video encoder 20 and video decoder 30 may interpolate motion vectors for the sub-blocks, including the corner sub-blocks, based on the motion vectors for the plurality of control points. For instance, video encoder 20 and video decoder 30 may perform the operations of equation (2) to interpolate the motion vectors for the sub-blocks of the affine block if video encoder 20 and video decoder 30 determined the motion vectors for the top-left, top-right, and bottom-left control points, or perform the operations of equation (4) to interpolate the motion vectors for the sub-blocks of the affine block if video encoder 20 and video decoder 30 determined the motion vectors for the top-left and top-right control points.

In the first example method, rather than determining the MVPs for the corresponding corner sub-blocks based on motion vectors for control points (e.g., rather than the example illustrated in FIG. 7), video encoder 20 and video decoder 30 may set the MVPs corresponding to the respective sub-blocks of the affine block equal to the interpolated motion vectors for the corresponding sub-blocks of the affine block. For instance, rather than the example of FIG. 7, video encoder 20 and video decoder 30 set the MVPs of the corresponding sub-blocks equal to the interpolated motion vectors such that the MVPs of the corresponding sub-blocks are equal to the motion vectors illustrated in FIG. 6.

In some examples, such as in FIGS. 6 and 7, it may be only for the four corner sub-blocks that the motion vector (e.g., in FIG. 6) is different than the MVP for the corresponding sub-block (e.g., in FIG. 7). Accordingly, video encoder 20 and video decoder 30 may interpolate motion vectors for the corner sub-blocks based on the motion vectors for the plurality of control points, and set the MVPs corresponding to the respective corner sub-blocks of the affine block equal to the interpolated motion vectors of the respective corner sub-blocks.

The following describes a second example method of MVF generation. The unified MVF for an affine inter block is generated by calculating MVs for each sub-block except for the four corner sub-blocks within an affine block using the MVs of the control points of the current affine block by affine motion model (e.g., using the equation (2), (4), (6) or any other representation of affine motion model). In the unified MVF, moreover, the four corner sub-blocks (e.g. 4×4 block) utilize the MVs of the nearby control points as shown in FIG. 7. The unified MVF is used for both MCP and stored as the MVP for the following blocks.

The second example method may be considered as the inverse of the above first example method. For example, in the first example method, video encoder 20 and video decoder 30 may first interpolate the motion vectors for the corner sub-blocks of the affine block, and then set the MVPs for the corresponding corner sub-blocks equal to the motion vectors for the corresponding corner sub-blocks. In the second example method, video encoder 20 and video decoder 30 may set the motion vectors for the corner sub-blocks equal to the motion vectors for the respective control points. For the remaining sub-blocks, video encoder 20 and video decoder 30 may interpolate their motion vectors using equations (2) or (4), as described above.

Video encoder 20 and video decoder 30 may set the MPVs corresponding to respective corner sub-blocks of the affine block equal to the motion vectors for the respective plurality of control blocks. For the remaining sub-blocks (e.g., those not in the corner of the affine block), video encoder 20 and video decoder 30 may set the MPVs corresponding to these non-corner sub-blocks equal to their corresponding interpolated motion vectors.

Figure 11:
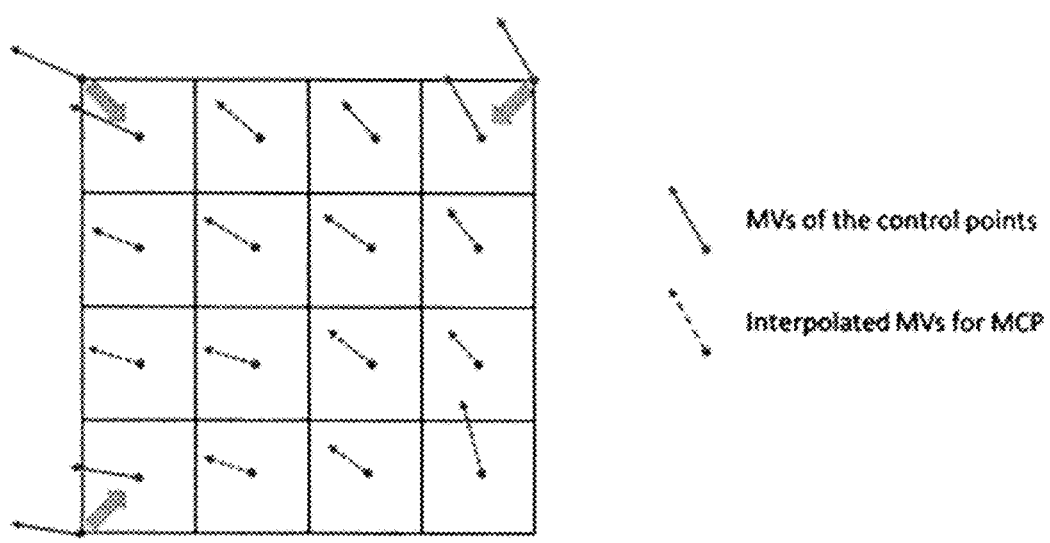
FIG. 11 illustrates another stored MV field.

The following describes a third example method of MVF generation. The unified MVF for an affine inter block is generated by calculating MVs for each sub-block except for three of the four corner sub-blocks within an affine block using the MVs of the control points of the current affine block by affine motion model (e.g., using the equation (2), (4), (6) or any other representation of affine motion model). In the unified MVF, moreover, the three of the four corner sub-blocks (e.g. 4×4 block) utilize the MVs of the nearby control points. For example, as shown in FIG. 11, the MVs of top-left, top-right and bottom-left sub-block are replaced by the MVs of the nearby control points, respectively. The unified MVF is used for both MCP and stored as the MVP for the following blocks. For example, in FIG. 11, the MV of each sub-block (e.g. 4×4 block) is interpolated by the MVs of the control points. The stored MVs of the three of the four corner four sub-blocks are the MVs of the nearby control points.

In the third example method, video encoder 20 and video decoder 30 may set the motion vectors for three of the four corner sub-blocks (e.g., top-left, top-right, and bottom-left), as illustrated in FIG. 11, equal to the motion vectors for the corresponding control points. However, for the fourth corner sub-block (e.g., bottom-right), video encoder 20 and video decoder 30 may interpolate its motion vector based on the motion vectors of the control points. In this example, the MVPs corresponding to the top-left, top-right, and bottom-left corner sub-blocks may be equal to the respective motion vectors of the control points, and the MVP corresponding to the bottom-right corner sub-block may be equal to the interpolated motion vector for the bottom-right sub-block.

In the third example method, video encoder 20 and video decoder 30 may not determine a motion vector for the bottom-right control point (e.g., bottom-right corner) to set the MVP corresponding to the bottom-right sub-block, thereby saving processing time. In this example, the MVP corresponding to the bottom-right sub-block may be set equal to the motion vector for the bottom-right sub-block. Video encoder 20 and video decoder 30 may have already determined the motion vectors for the other control points as part of the affine inter or affine merge.

In examples where video encoder 20 and video decoder 30 only determine the motion vectors for the top-left and top-right control points, video encoder 20 and video decoder 30 may set the motion vector for the top-left corner sub-block equal to the motion vector of the top-left control point, and set the motion vector for the top-right corner sub-block equal to the motion vector of the top-right control point. Video encoder 20 and video decoder 30 may set the MVP corresponding to the top-right corner sub-block equal to the motion vector of the top-right control point, and set the motion vector for the top-left corner sub-block equal to the motion vector for the top-left control point. For the bottom-right and bottom-left corner sub-blocks, video encoder 20 and video decoder 30 may interpolate their motion vectors, and set MVPs corresponding to the bottom-right and bottom-left corner sub-blocks equal to their corresponding interpolated motion vectors.

For the above examples, the sub-block size can be either variable or fixed (e.g. 4×4 block). If the sub-block size is variable, the size can be dependent on the MV differences between the control points or the affine parameters.

Figures 12A, 12B:
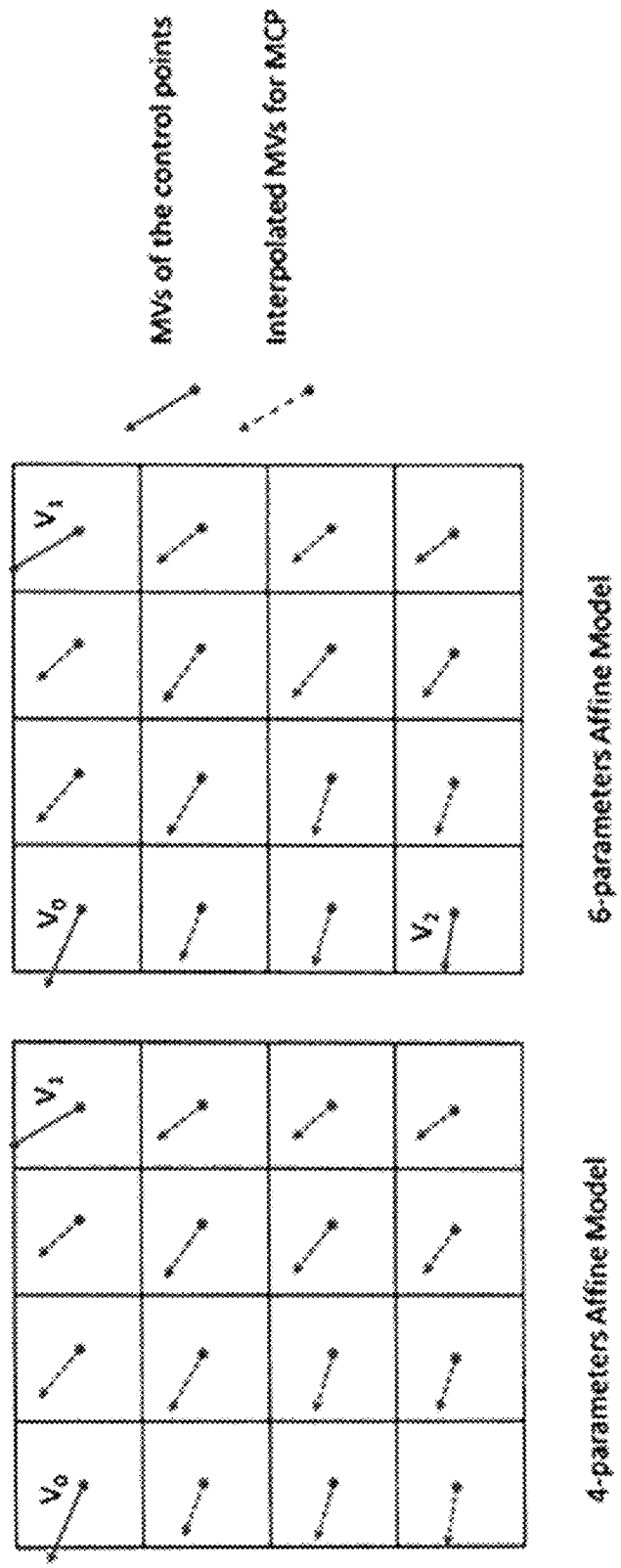
FIG. 12A illustrates an example of a 4-parameter affine model.
FIG. 12B illustrates an example of a 6-parameter affine model.
Figure 13B:
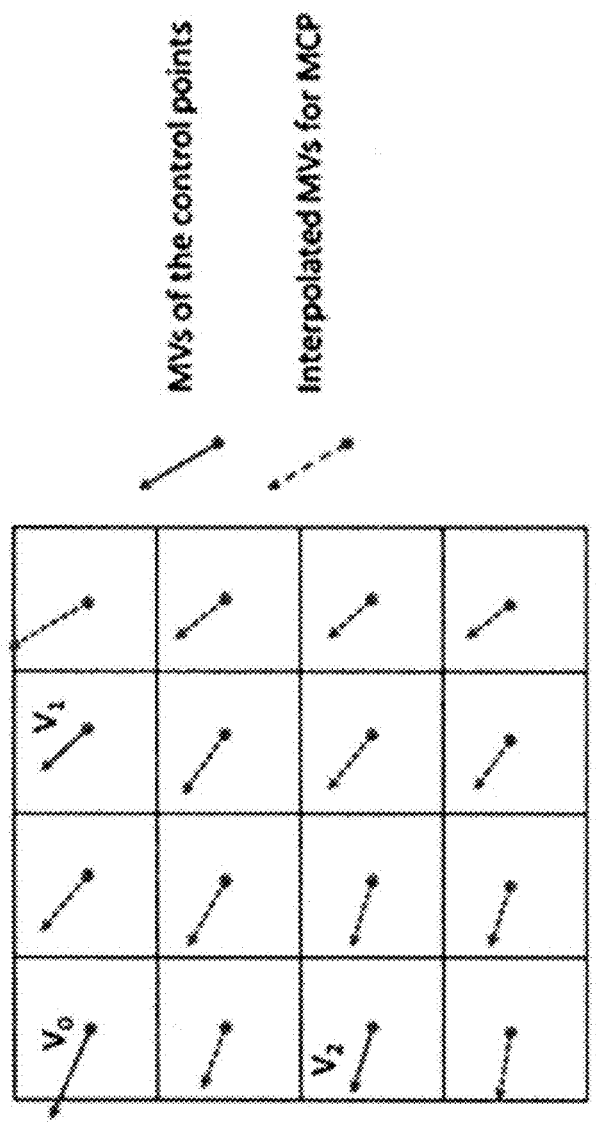
FIG. 13B illustrates an example of a 6-parameter affine model.
Figure 13A:
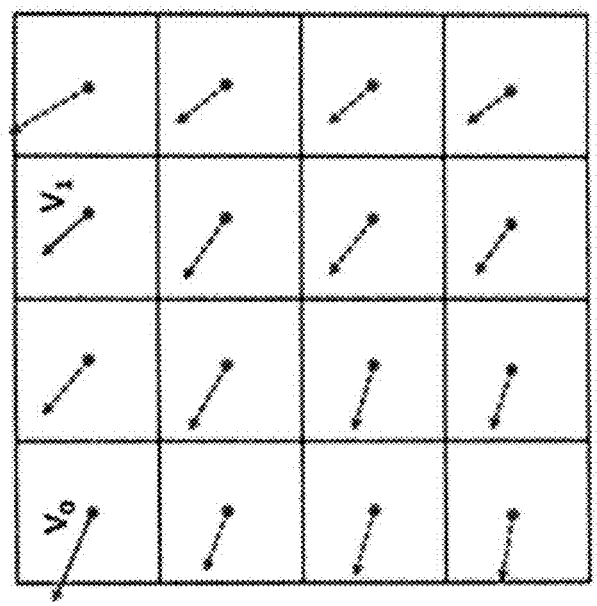
FIG. 13A illustrates an example of a 4-parameter affine model.

The following describes examples for control points selection. The control points for the affine inter mode can be the top-left, top-right and bottom-left corner points as used in JEM3.0 and JVET-C0062. In another example, the control points can be the center points of the corner sub-blocks (e.g., the center coordinates are sub-block height/2 and sub-block width/2). For example, as shown in FIGS. 12A and 12B, the control points for the affine model are the center points of the top-left and top-right sub-blocks (and bottom-left sub-block for 6-parameter model), respectively. Any points within current block can be used as the control points for the affine motion model. In another example, the control points for the affine model are the center points of the sub-blocks as shown in FIGS. 13A and 13B. In FIGS. 13A and 13B, the control points can be selected as the centers of the left-middle and top-middle sub-blocks. In this design, the horizontal or vertical distance of any two control points is equal to W/2 or H/2 (W and H is the width and height of the current block), so that the MV of each sub-block can be derived by using shift operation (i.e. avoiding division operation). FIGS. 12A, 12B, 13A, and 13B illustrate new control points for the affine motion model.

Accordingly, in one or more examples, video encoder 20 and video decoder 30 may determine motion vectors for control points of the affine block, where the control points may be points at respective centers within one or more of the sub-blocks (e.g. as illustrated in FIGS. 12A, 12B, 13A, and 13B). In such examples, video encoder 20 and video decoder 30 may determine the motion vectors for the sub-blocks based on the determined motion vectors for the control points. Video encoder 20 and video decoder 30 may similarly determine the MVPs for the corresponding sub-blocks from the motion vectors for the sub-blocks or the motion vectors for the control points, where the motion vectors for the control points are not at a corner of the affine block, but within the sub-blocks (e.g., starting from a center of the sub-blocks).

The following describes an additional buffer for the affine parameters. This disclosure also describes the use of additional buffers other than the motion vector buffers to store the affine parameters for each affine inter block (block can be coding unit (CU) or prediction unit (PU) as defined in HEVC). The bit-depth of the parameters buffer can be aligned with the bit-depth of the motion vector buffer or can be in any bit-depth (e.g. 8-bits, 10 bits, 16 bits or any other representations) for different applications.

In one example, the stored affine parameters can be any or all of the six or four parameters as described in equation 1 or 3. In another example, when the affine motion model is represented by the motion vectors of the control points as shown in equation 2 or 4, the stored affine parameters can also be any or all of the six or four parameters as described in equation 2 or 4. For example, in the simplified 4-parameters affine model used in JEM-3.0, the parameters $v_{0x}$, $v_{0y}$, $v_{1x}$, $v_{1y}$ are stored in the parameters buffers (the parameter w can be derived using the coded information). In another example, $v_{0x}$, $v_{0y}$, $$\frac{(v_{1x} - v_{0x})}{w}, \frac{(v_{1y} - v_{0y})}{w}$$

are stored in the parameters buffers. MV difference between $v_0$ and $v_1$ can be represented in the unit of the smallest MV block size (such as 4×4 block). In this way, the parameters $$\frac{(v_{1x} - v_{0x})}{(w/4)} \text{ and } \frac{(v_{1y} - v_{0y})}{(w/4)}$$

are stored instead of, or in addition to, $$\frac{(v_{1x} - v_{0x})}{w} \text{ and } \frac{(v_{1y} - v_{0y})}{w}.$$

The following describes MVF generation for affine merge mode. In a first MVF generation method, the MVs of the control point for an affine merge block is generated using the MVs of the control points of the neighbor and then the unified MVF for an affine merge block is generated using the methods for an affine inter block as described with respect to MVF generation for affine inter mode. The unified MVF is used for both MCP and stored as the MVP for the following blocks. As an example, the motion vectors $v_0$ and $v_1$ of the top-left and top-right control points of the current affine merge block is generated based on equation (5).

After generating the $v_0$ and $v_1$ of current affine block using the MVs of the neighbor affine block $v_2$, $v_3$ and $v_4$, the unified MVF for an affine merge block is generated by calculating MVs for each sub-block within the current affine block using affine motion model (e.g. equation (2), (4), or (6)). The sub-block size can be either fixed or variable depending on the MV differences between the control points.

For example, video encoder 20 and video decoder 30 may determine motion vectors for control points of the affine block based on motion vectors of control points of a neighboring block. Based on the determined motion vector for the control points of the affine block, video encoder 20 and video decoder 30 may interpolate motion vectors for the sub-blocks of the affine block. Video encoder 20 and video decoder 30 may set the MVPs corresponding to respective sub-blocks of the affine block equal to the interpolated motion vectors.

In a second MVF generation method, the unified MVF for an affine merge block is directly generated by calculating MVs for each sub-block within an affine block using the MVs of the control points of the neighbor affine block by affine motion model (e.g., using equation (2), (4), (6) or any other representation of affine motion model). The unified MVF is used for both MCP and stored as the MVP for the following blocks. In this example, the motion vectors for the control points of the neighboring affine block are used directly to determine the motion vectors for the sub-blocks without the intermediate step of determining motion vectors for the control points of the current block.

In both the first and second MVF generation method for affine merge, the motion vectors for the sub-blocks are based on the motion vectors for the control points of the neighboring affine block. In the first MVF generation method for affine merge, the motion vectors of the control points of the neighboring affine block are used to determine the motion vectors of control points of the affine block, and then the motion vectors for the sub-blocks are interpolated. In the second MVF generation method for affine merge, the motion vectors of the control points of the neighboring affine block are used to directly determine the motion vectors for the sub-blocks of the affine block.

In a third MVF generation method, the unified MVF for an affine merge block is directly generated by calculating MVs for each sub-block except for the four corner sub-blocks within an affine block using the MVs of the control points of the neighbor affine block by affine motion model (e.g., using the equation (2), (4), (6) or any other representation of affine motion model). Moreover, the four corner sub-blocks (e.g. 4×4 block) utilize the MVs of the nearby control points as shown in FIG. 7. The unified MVF is used for both MCP and stored as the MVP for the following blocks.

For example, video encoder 20 and video decoder 30 may set the motion vectors for the corner sub-blocks of the affine block equal to the motion vectors of respective control points. Video encoder 20 and video decoder 30 may also set the MVPs for the corresponding corner sub-blocks equal to the motion vectors of respective control points. In this way, the motion vectors for the sub-blocks of the affine block and the corresponding MVPs of the sub-blocks are equal.

In a fourth MVF generation method, the unified MVF for an affine merge block is directly generated by calculating MVs for each sub-block except for three of the four corner sub-blocks within an affine block using the MVs of the control points of the neighbor affine block by affine motion model (e.g., equation (2), (4), (6) or any other representation of affine motion model). Moreover, the three of the four corner sub-blocks (e.g. 4×4 block) utilize the MVs of the nearby control points. For example, as shown in FIG. 11, the MVs of top-left, top-right and bottom-left sub-blocks are replaced by the MVs of the nearby control points, respectively. The unified MVF is used for both MCP and stored as the MVP for the following blocks.

In the fourth example method for affine merge mode, similar to the above third example technique of affine inter mode, video encoder 20 and video decoder 30 may set the motion vectors for three of the four corner sub-blocks (e.g., top-left, top-right, and bottom-left), as illustrated in FIG. 11, equal to the motion vectors for the corresponding control points. However, for the fourth corner sub-block (e.g., bottom-right), video encoder 20 and video decoder 30 may interpolate its motion vector based on the motion vectors of the control points. In this example, the MVPs corresponding to the top-left, top-right, and bottom-left corner sub-blocks may be equal to the respective motion vectors of the control points, and the MVP corresponding to the bottom-right corner sub-block may be equal to the interpolated motion vector for the bottom-right sub-block.

In the fourth example method for affine merge mode, video encoder 20 and video decoder 30 may not determine a motion vector for the bottom-right control point (e.g., bottom-right corner) to set the MVP corresponding to the bottom-right sub-block, thereby saving processing time. Video encoder 20 and video decoder 30 may have already determined the motion vectors for the other control points as part of the affine merge.

In examples where video encoder 20 and video decoder 30 only determine the motion vectors for the top-left and top-right control points, video encoder 20 and video decoder 30 may set the motion vector for the top-left corner sub-block equal to the motion vector of the top-left control point, and set the motion vector for the top-right corner sub-block equal to the motion vector of the top-right control point. Video encoder 20 and video decoder 30 may set the MVP corresponding to the top-right corner sub-block equal to the motion vector of the top-right control point, and set the motion vector for the top-left corner sub-block equal to the motion vector for the top-left control point. For the bottom-right and bottom-left corner sub-blocks, video encoder 20 and video decoder 30 may interpolate their motion vectors, and set MVPs corresponding to the bottom-right and bottom-left corner sub-blocks equal to their corresponding interpolated motion vectors.

For the above-mentioned methods, the sub-block size can be either variable or fixed (e.g. 4×4 block). If the sub-block size is variable, the size can be dependent on the MV differences between the control points or the affine parameters.

Figure 14:
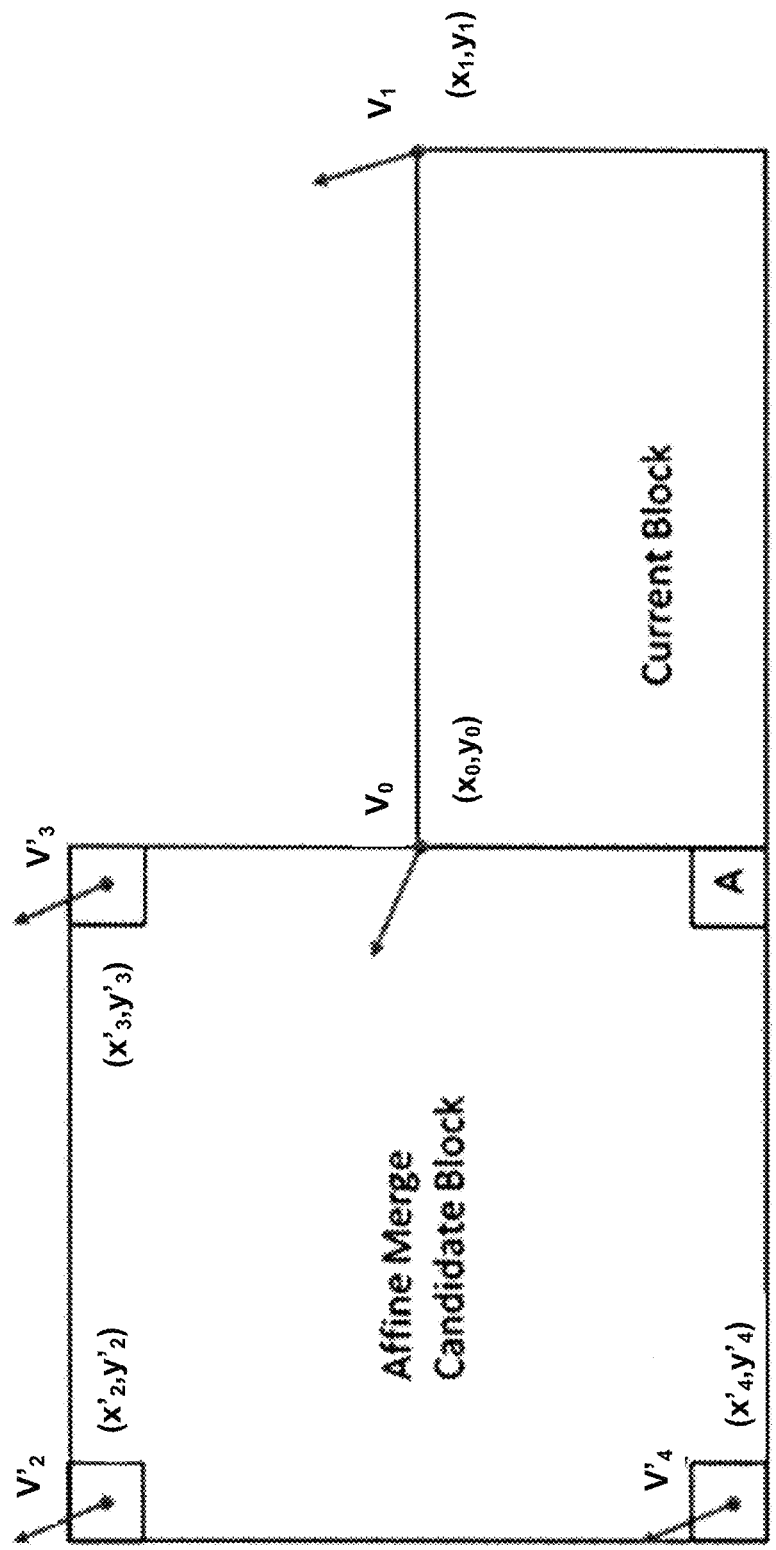
FIG. 14 illustrates an example of MVP for a 6-parameter affine inter model.

In another example, there may not be a need to generate the MVs of the control points for current affine merge block. The MVs of the control points of the neighbor affine block may be used directly to generate the MVs for each sub-block within current affine merge block. As shown in FIG. 14, when the generated affine MVs for the center points of the corner sub-blocks are stored for the corner sub-blocks, the control points of neighbor affine block become $v'_2$, $v'_3$ and $v'_4$. It is noted that the control points can be selected as any three points within the neighbor affine block.

The motion vectors $v_0$ and $v_1$ of the top-left and top-right control points of the current affine merge block are then generated based on equation (6) as shown below.

$$\begin{cases} v_x = \frac{(v'_{3x} - v'_{2x})}{w}x + \frac{(v'_{4x} - v'_{2x})}{h}y + v'_{2x} \\ v_y = \frac{(v'_{3y} - v'_{2y})}{w}x + \frac{(v'_{4y} - v'_{2y})}{h}y + v'_{2y} \end{cases} \quad (6)$$

where $(v'_{2x}, v'_{2y})$ is motion vector of the top-left corner control point $(x'_2, y'_2)$, which is assumed as the original point, $(v'_{3x}, v'_{3y})$ is motion vector of the top-right corner control point $(x'_3, y'_3)$, $(v'_{4x}, v'_{4y})$ is motion vector of the bottom-left corner control point $(x'_4, y'_4)$ in the neighbor affine block, $w=(x'_3-x'_2)$ is the horizontal distance between the top-left and top-right control points, and $h=(y'_4-y'_2)$ is the vertical distance between the top-left and bottom-left control points.

After generating the $v_0$ and $v_1$ of current affine block using the MVs of the neighbor affine block $v'_2$, $v'_3$ and $v'_4$, the unified MVF for an affine merge block is generated by calculating MVs for each sub-block within the current affine block using affine motion model (e.g., equation (2), (4), (6)). The sub-block size can be either fixed or variable depending on the MV differences between the control points.

In accordance with FIG. 14, in one example, video encoder 20 and video decoder 30 may determine motion vectors for control points of the affine block based on motion vectors for control points of another affine block (e.g., affine merge candidate block of FIG. 14). The control points of this other affine block may be points at respective centers within one or more sub-blocks of the other affine block (e.g., as illustrated with the $v'_2$, $v'_3$ and $v'_4$. In general, for affine merge mode, video encoder 20 and video decoder 30 may determine the affine merge candidate (e.g., as illustrated in FIGS. 9B and 14). Video encoder 20 and video decoder 30 may determine motion vectors for control points of the affine block based on the motion vectors for the control points of the affine merge candidate. In one example, the control points of the affine merge candidate may be at the corners, as illustrated in FIG. 9B, and in one example, the control points of the affine merge candidate may be in the middle of the sub-blocks, as illustrated in FIG. 14. In these examples of affine merge mode, video encoder 20 and video decoder 30 may determine the motion vectors for the sub-blocks within an affine block based on the motion vectors of the control points of the affine block.

The following describes an additional buffer or buffers for the affine parameters. The affine parameters for an affine merge mode are derived using the information of the neighbor coded blocks. This disclosure describes, after the affine parameters for an affine merge block are derived, the use of additional buffers other than the motion vector buffers to store the affine parameters for each affine merge block (block can be coding unit (CU) or prediction unit (PU) as defined in HEVC). The bit-depth of the parameters buffer can be aligned with the bit-depth of the motion vector buffer or can be in any bit-depth (e.g. 8-bits, 10-bits, 16-bits or any other representations) for different applications.

In one example, the stored affine parameters can be any or all of the six or four parameters as described in equation 1 or 3. In another example when the affine motion model is represented by the motion vectors of the control points as shown in equation 2 or 4, the stored affine parameters can also be any or all of the six or four parameters as described in equation 2 or 4. For example, in the simplified 4-parameters affine model used in JEM-3.0, the parameters $v_{0x}$, $v_{0y}$, $v_{1x}$, $v_{1y}$ are stored in the parameters buffers (the parameter w can be derived using the coded information). In another example, $v_{0x}$, $v_{0y}$, $$\frac{(v_{1x} - v_{0x})}{w}, \frac{(v_{1y} - v_{0y})}{w}$$

are stored in the parameters buffers. MV difference between $v_0$ and $v_1$ can be represented in the unit of the smallest MV block size (such as 4×4 block). In this way, the parameters $$\frac{(v_{1x} - v_{0x})}{(w/4)} \text{ and } \frac{(v_{1y} - v_{0y})}{(w/4)}$$

can be stored instead of, or in addition to, $$\frac{(v_{1x} - v_{0x})}{w} \text{ and } \frac{(v_{1y} - v_{0y})}{w}.$$

Figure 15:
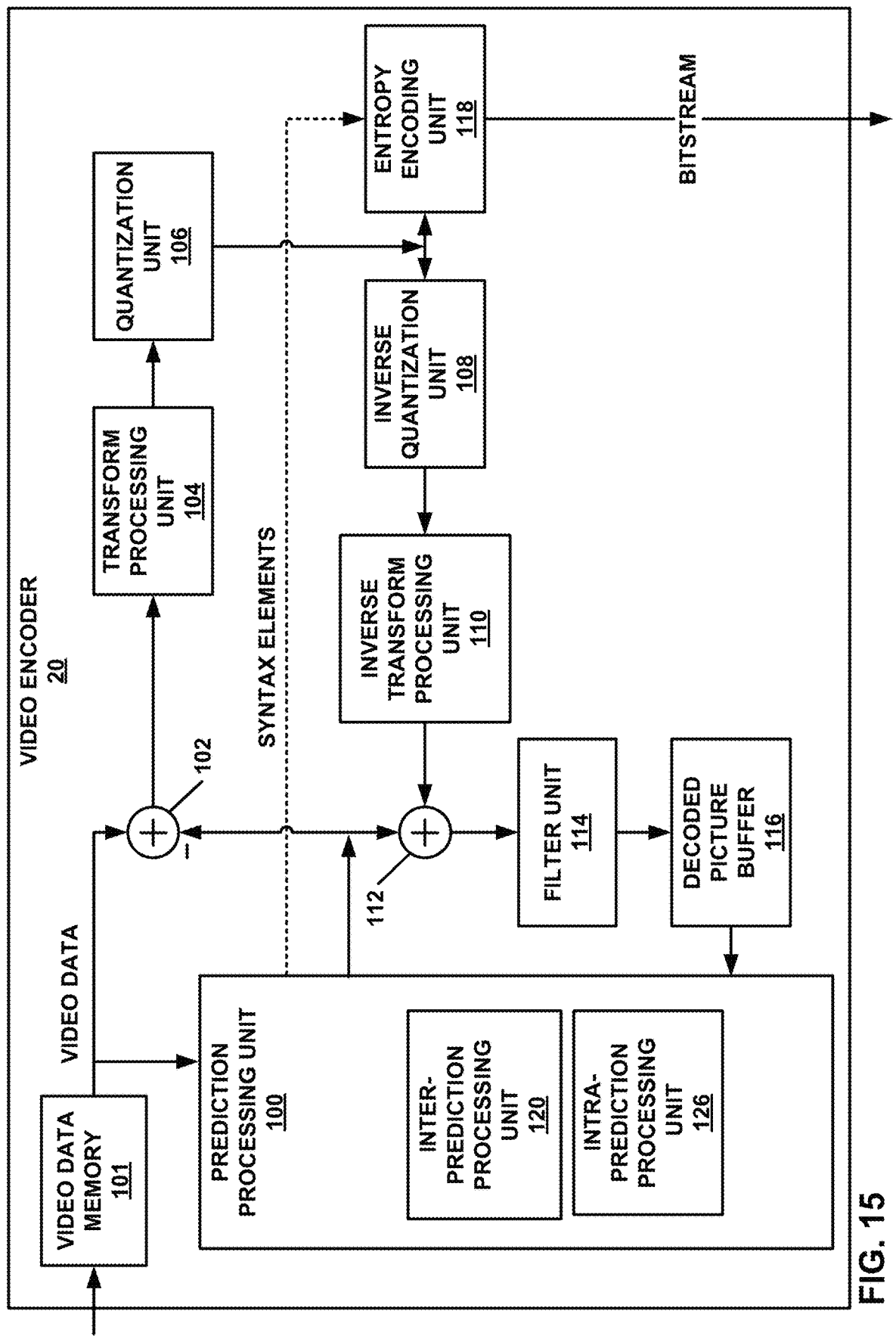
FIG. 15 is a block diagram illustrating an example video encoder that may implement one or more techniques described in this disclosure.

FIG. 15 is a block diagram illustrating an example video encoder 20 that may implement the techniques of this disclosure. FIG. 15 is provided for purposes of explanation and should not be considered limiting of the techniques as broadly exemplified and described in this disclosure. The techniques of this disclosure may be applicable to various coding standards or methods.

In the example of FIG. 15, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

The various units illustrated in FIG. 15 are examples of fixed-function circuits, programmable circuits, or a combination thereof. For example, the various units illustrated in FIG. 15 may include arithmetic logic units (ALUs), elementary function units (EFUs), logic gates, and other circuitry that can be configured for fixed function operation, configured for programmable operation, or a combination.

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be in or connected to video encoder 20.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Inter-prediction processing unit 120 may apply the techniques for affine motion models as described elsewhere in this disclosure. For example, inter-prediction processing unit 120 may perform the example operations described above for the motion vector field (MVF) generation for affine inter mode and affine merge mode. Although inter-prediction processing unit 120 is described as performing the example operations, in some examples, one or more other units in addition to or instead of inter-prediction processing unit 120 may perform the example methods, and the techniques are not limited to inter-prediction processing unit 120 performing the example operations.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform partitioning of the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Accordingly, FIG. 15 illustrates one example of video encoder 20 that may be configured to perform the example operations described in this disclosure. As one example, inter-prediction processing unit 120 may determine motion vectors for sub-blocks of an affine block, where the motion vectors for the sub-blocks are a motion compensation prediction (MCP) motion vector field (MVF) for the sub-blocks. For instance, inter-prediction processing unit 120 uses the motion vectors for the sub-blocks to inter-prediction encode the sub-blocks. As an example, inter-prediction processing unit 120 may determine predictive blocks based on the motion vectors for the sub-blocks, determine residual data for the affine block based on a difference between the predictive blocks and the affine block, and signal information indicative of the residual data.

In accordance with one or more examples, inter-prediction processing unit 120 may determine motion vector predictors (MVPs) corresponding to respective sub-blocks. Again, MVPs corresponding to respective sub-blocks refers to motion information of the sub-blocks when the motion information for the sub-blocks is used as a predictor for a subsequent block. The MVP corresponding to a sub-block refers to the motion vector information that will be used as a motion vector predictor to determine the motion vector for a subsequent block. The MVP corresponding to a sub-block should not be confused to mean that it is the predictor used by the sub-block to determine the motion information for that sub-block. Rather, the MVP corresponding to a sub-block is the motion information for that sub-block that is used as a motion vector predictor for determining the motion vector of a subsequent block.

Inter-prediction processing unit 120 may determine that the MVPs corresponding to respective corner sub-blocks of the affine block are the same as motion vectors for the respective corner sub-blocks. The MVPs corresponding to respective corner sub-blocks of the affine block being the same as motion vectors for the respective corner sub-blocks refers to the top-left corner sub-block having the same motion vector and corresponding MVP, the top-right corner sub-block having the same motion vector and corresponding MVP, the bottom-left corner sub-block having the same motion vector and corresponding MVP, and the bottom-right corner sub-block having the same motion vector and corresponding MVP. In some examples, in addition to the corner sub-blocks, inter-prediction processing unit 120 may determine that the motion vectors for each of the sub-blocks are the same as the respective MVPs corresponding to the sub-blocks.

For instance, as described above with respect to FIGS. 6 and 7, in some conventional techniques, the motion vectors for the corner sub-blocks, as illustrated in FIG. 6, are different than the MVPs corresponding to those corner sub-blocks, as illustrated in FIG. 7. In FIG. 7, rather than the MVPs corresponding to corner sub-blocks being equal to the interpolated motion vectors for the corner sub-blocks, the MVPs corresponding to corner sub-blocks are equal to the motion vectors of the control points. In one or more examples, the motion vectors for the corner sub-blocks and the MVPs corresponding to the corner sub-blocks are the same, unlike some conventional techniques such as those illustrated in FIGS. 6 and 7. In one or more examples, the motion vectors for each of the sub-blocks and the MVPs corresponding to each of the sub-blocks are the same.

There may be various example ways in which video encoder 20 may ensure that the motion vectors for the sub-blocks (e.g., corner sub-blocks) are the same as the MVPs corresponding to the sub-blocks (e.g., corner sub-blocks). As one example, inter-prediction processing unit 120 may determine motion vectors for a plurality of control points of the affine block, and interpolate motion vectors for the corner sub-blocks based on the motion vectors for the plurality of control points. Inter-prediction processing unit 120 may set the MVPs corresponding to the respective corner sub-blocks of the affine block equal to the interpolated motion vectors of the respective corner sub-blocks. Inter-prediction processing unit 120 may perform the same operations for each of the sub-blocks. In this way, each of the sub-blocks has the same motion vector and corresponding MVP.

As another example, inter-prediction processing unit 120 may determine motion vectors for a plurality of control points of the affine block, and set the motion vectors for at least three of the four corner sub-blocks equal to the motion vectors for the respective three of the four plurality of control points. Inter-prediction processing unit 120 may set the MVPs corresponding to the respective corner sub-blocks of the affine block equal to the motion vectors for the respective plurality of control points. In some examples, inter-prediction processing unit 120 may set the motion vectors for all four corner sub-blocks equal to the motion vectors for respective four control points.

As an example, the control points of the affine block may be the corners of the affine block. In one example, inter-prediction processing unit 120 may determine the motion vectors for three of the four control points, and set the motion vectors for the corner sub-blocks of the respective three control points equal to the motion vectors of the control points. For the fourth corner sub-block, inter-prediction processing unit 120 may interpolate its motion vector from the motion vectors for the control points. In one example, inter-prediction processing unit 120 may determine the motion vectors for all four control points, and set the motion vectors for all four corner sub-blocks of the respective four control points equal to the motion vectors of the four control points. The control point need not necessarily be at the corner of the affine block, and may be in the middle of the sub-blocks.

As another example of ensuring that the motion vectors and corresponding MVPs for sub-blocks are the same, inter-prediction processing unit 120 may determine motion vectors for control points of the affine block. The control points may be points at respective centers within one or more of the sub-blocks. Inter-prediction processing unit 120 may determine the motion vectors for the sub-blocks based on the determined motion vectors for the control points.

The affine block that inter-prediction processing unit 120 is inter-predicting may be an affine inter mode predicted block or an affine merge mode predicted block. For the affine inter mode, inter-prediction processing unit 120 may determine motion vectors for control points of the affine block, and determine an entry into a candidate list with a plurality of motion vectors sets based on the determined motion vectors. Inter-prediction processing unit 120 may signal information indicative of the entry into the candidate list. For the affine merge mode, inter-prediction processing unit 120 may determine another affine block (e.g., second affine block) that neighbors the current affine block (e.g., first affine block). Inter-prediction processing unit 120 may determine that motion vectors for control points of the first affine block are based on motion vectors for control points for the second affine block. In such example, inter-prediction processing unit 120 may determine the motion vectors for the sub-blocks based on the determined motion vectors for the control points of the first affine block. In some examples, the control points of the second affine block are control points at the centers of one or more sub-blocks of the second affine block.

Inter-prediction processing unit 120 may inter-prediction encode a subsequent block based in part on the determined MVPs. As one example, inter-prediction processing unit 120 may include at least one MVP of the MVPs in a merge or advanced motion vector prediction (AMVP) candidate list. Inter-prediction processing unit 120 may determine a motion vector for the subsequent block, and select the MVP from the merge or AMVP candidate list based on the determined motion vector for the subsequent block. Inter-prediction processing unit 120 may signal information indicative of the selected MVP.

As an example, inter-prediction processing unit 120 may include the MVP corresponding to the top-left corner sub-block in a merge or AMVP candidate list, and determine a motion vector of the subsequent block. Inter-prediction processing unit 120 may determine whether the MVP corresponding to the top-left corner sub-block is equal to or can be set equal to the motion vector of the subsequent block, or can be a good predictor for the motion vector of the subsequent block. If the MVP corresponding to the top-left corner sub-block is equal to or can be set equal to the motion vector of the subsequent block, or can be a good predictor for the motion vector of the subsequent block, then inter-prediction processing unit 120 may select the MVP for the corner sub-block. Inter-prediction processing unit 120 may signal information indicative of an entry of the selected MVP in the merge or AMVP candidate list.

Figure 16:
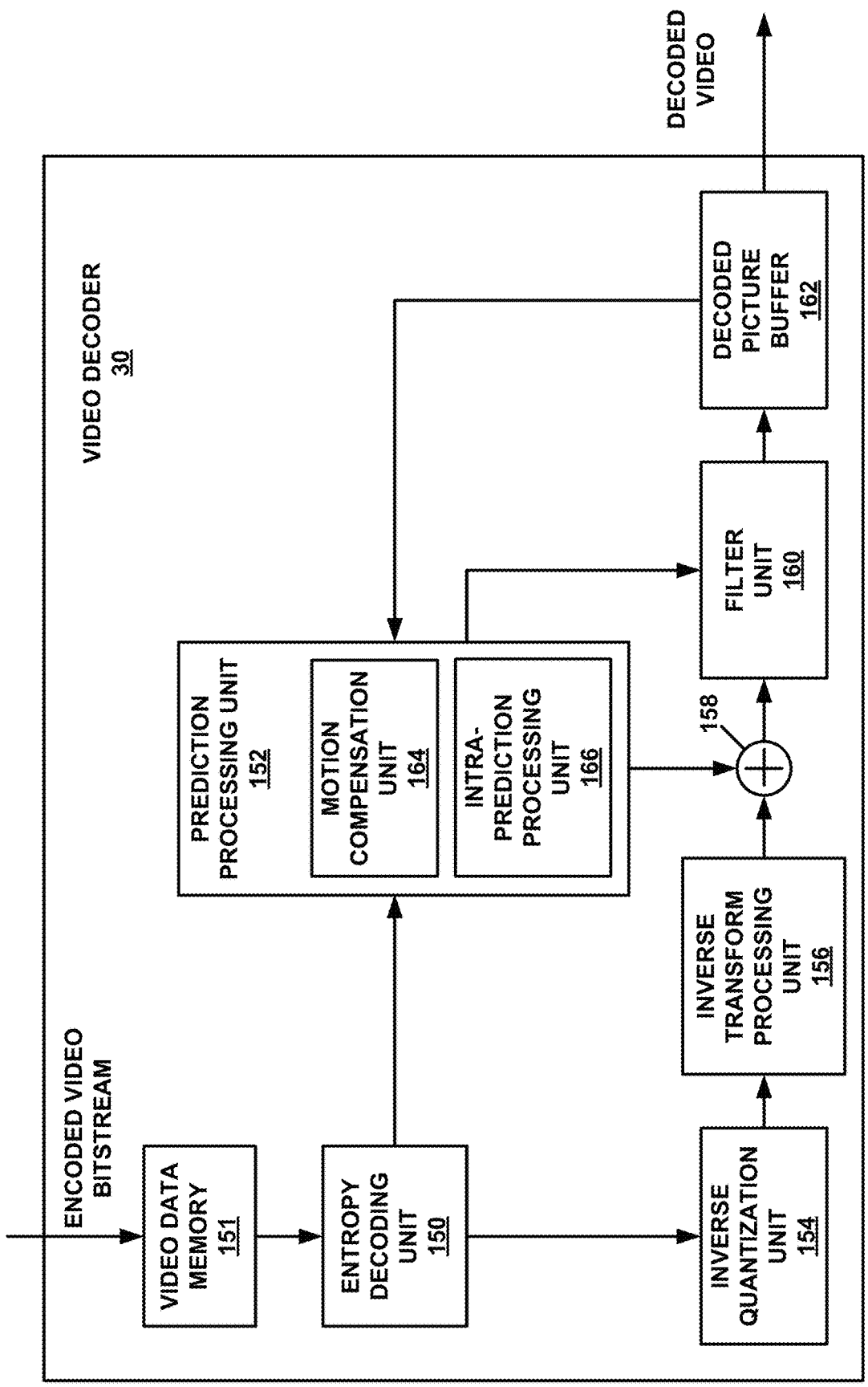
FIG. 16 is a block diagram illustrating an example video decoder that may implement one or more techniques described in this disclosure.

FIG. 16 is a block diagram illustrating an example video decoder 30 that is configured to implement the techniques of this disclosure. FIG. 16 is provided for purposes of explanation and is not limiting on the techniques as broadly exemplified and described in this disclosure. For purposes of explanation, this disclosure describes video decoder 30 in the context of HEVC coding as an example. However, the techniques of this disclosure may be applicable to other coding standards or methods.

In the example of FIG. 16, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

The various units illustrated in FIG. 16 are examples of fixed-function circuits, programmable circuits, or a combination. For example, the various units illustrated in FIG. 16 may include arithmetic logic units (ALUs), elementary function units (EFUs), logic gates, and other circuitry that can be configured for fixed function operation, configured for programmable operation, or a combination.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. The video data may be encoded video data such as that encoded by video encoder 20. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode (e.g., using CABAC) entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 (also called inter-prediction processing unit 164) may determine, based on the motion information of the PU, one or more reference blocks. Motion compensation unit 164 may generate, based on the one or more reference blocks, predictive blocks (e.g., predictive luma, Cb and Cr blocks) for the PU.

Motion compensation unit 164 may apply the techniques for affine motion models as described elsewhere in this disclosure. For example, motion compensation unit 164 may perform the example operations described above for the motion vector field (MVF) generation for affine inter mode and affine merge mode. Although motion compensation unit 164 is described as performing the example operations, in some examples, one or more other units in addition to or instead of motion compensation unit 164 may perform the example methods, and the techniques are not limited to motion compensation unit 164 performing the example operations.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Accordingly, FIG. 16 illustrates one example of video decoder 30 that may be configured to perform the example operations described in this disclosure. As one example, motion compensation unit 164 may determine motion vectors for sub-blocks of an affine block, where the motion vectors for the sub-blocks are a motion compensation prediction (MCP) motion vector field (MVF) for the sub-blocks. For instance, motion compensation unit 164 uses the motion vectors for the sub-blocks to inter-prediction decode the sub-blocks. For example, motion compensation unit 164 may inter-prediction decode the affine block, as part of MCP, based on the motion vectors that form the MVF for the sub-blocks of the affine block including the corner sub-blocks. As an example, motion compensation unit 164 may determine predictive blocks based on the motion vectors for the sub-blocks, receive residual data for the affine block, and reconstruct the affine block based on the predictive blocks and the residual data.

In accordance with one or more examples, motion compensation unit 164 may determine motion vector predictors (MVPs) corresponding to respective sub-blocks. Again, MVPs corresponding to respective sub-blocks refers to motion information of the sub-blocks when the motion information for the sub-blocks is used as a predictor for a subsequent block. The MVP corresponding to a sub-block refers to the motion vector information that will be used as a motion vector predictor to determine the motion vector for a subsequent block. The MVP corresponding to a sub-block should not be confused to mean that it is the predictor used by the sub-block to determine the motion information for that sub-block. Rather, the MVP corresponding to a sub-block is the motion information for that sub-block that is used as a motion vector predictor for determining the motion vector of a subsequent block.

Motion compensation unit 164 may determine that the MVPs corresponding to respective corner sub-blocks of the affine block are the same as motion vectors for the respective corner sub-blocks. The MVPs corresponding to respective corner sub-blocks of the affine block being the same as motion vectors for the respective corner sub-blocks refers to the top-left corner sub-block having the same motion vector and corresponding MVP, the top-right corner sub-block having the same motion vector and corresponding MVP, the bottom-left corner sub-block having the same motion vector and corresponding MVP, and the bottom-right corner sub-block having the same motion vector and corresponding MVP. In some examples, in addition to the corner sub-blocks, motion compensation unit 164 may determine that the motion vectors for each of the sub-blocks are the same as the MVPs corresponding to the sub-blocks.

To reiterate from above, with respect to FIGS. 6 and 7, in some conventional techniques, the motion vectors for the corner sub-blocks, as illustrated in FIG. 6, are different than the MVPs corresponding to those corner sub-blocks, as illustrated in FIG. 7. In FIG. 7, rather than the MVPs corresponding to corner sub-blocks being equal to the interpolated motion vectors for the corner sub-blocks, the MVPs corresponding to corner sub-blocks are equal to the motion vectors of the control points. In one or more examples, the motion vectors for the corner sub-blocks and the MVPs corresponding to the corner sub-blocks are the same, unlike some conventional techniques such as those illustrated in FIGS. 6 and 7. In one or more examples, the motion vectors for each of the sub-blocks and the MVPs corresponding to each of the sub-blocks are the same.

There may be various example ways in which video decoder 30 may ensure that the motion vectors for the sub-blocks (e.g., corner sub-blocks) are the same as the MVPs corresponding to the sub-blocks (e.g., corner sub-blocks). As one example, motion compensation unit 164 may determine motion vectors for a plurality of control points of the affine block, and interpolate motion vectors for the corner sub-blocks based on the motion vectors for the plurality of control points. Motion compensation unit 164 may set the MVPs corresponding to the respective corner sub-blocks of the affine block equal to the interpolated motion vectors of the respective corner sub-blocks. Motion compensation unit 164 may perform the same operations for each of the sub-blocks. In this way, each of the sub-blocks has the same motion vector and corresponding MVP.

As another example, motion compensation unit 164 may determine motion vectors for a plurality of control points of the affine block, and set the motion vectors for at least three of the four corner sub-blocks equal to the motion vectors for the respective three of the four plurality of control points. Motion compensation unit 164 may set the MVPs corresponding to the respective corner sub-blocks of the affine block equal to the motion vectors for the respective plurality of control points. In some examples, motion compensation unit 164 may set the motion vectors for all four corner sub-blocks equal to the motion vectors for the respective four control points.

As an example, the control points of the affine block may be the corners of the affine block. In one example, motion compensation unit 164 may determine the motion vectors for three of the four control points, and set the motion vectors for the corner sub-blocks of the respective three control points equal to the motion vector of the control points. For the fourth corner sub-block, motion compensation unit 164 may interpolate its motion vector from the motion vectors for the control points. In one example, motion compensation unit 164 may determine the motion vectors for all four control points, and set the motion vectors for all four corner sub-blocks of the respective four control points equal to the motion vectors of the four control points. The control point need not necessarily be at the corner of the affine block, and may be in the middle of the sub-blocks.

As another example of ensuring that the motion vectors and corresponding MVPs for sub-blocks are the same, motion compensation unit 164 may determine motion vectors for control points of the affine block. The control points may be points at respective centers within one or more of the sub-blocks. Motion compensation unit 164 may determine the motion vectors for the sub-blocks based on the determined motion vectors for the control points.

The affine block that motion compensation unit 164 is inter-predicting may be an affine inter mode predicted block or an affine merge mode predicted block. For the affine inter mode, motion compensation unit 164 may determine an entry into a candidate list with a plurality of motion vector sets, and determine motion vectors for control points of the affine block based on the entry into the candidate list. In such examples, motion compensation unit 164 may determine the motion vectors for the sub-blocks based on the determined motion vectors for the control points.

For the affine merge mode, motion compensation unit 164 may determine another affine block (e.g., second affine block) that neighbors the current affine block (e.g., first affine block). Motion compensation unit 164 may determine motion vectors for control points of the first affine block based on motion vectors for control points for the second affine block. In such examples, motion compensation unit 164 may determine the motion vectors for the sub-blocks based on the determined motion vectors for the control points of the first affine block. In some examples, the control points of the second affine block are control points at the centers of one or more sub-blocks of the second affine block.

Motion compensation unit 164 may inter-prediction decode a subsequent block based in part on the determined MVPs. As one example, motion compensation unit 164 may include at least one MVP of the MVPs in a merge or advanced motion vector prediction (AMVP) candidate list. Motion compensation unit 164 may select the MVP from the merge or AMVP candidate list based on received information indicating an entry in the merge or AMVP candidate list having the at least one MVP. Motion compensation unit 164 may determine a motion vector for the subsequent block based on the selected MVP, and inter-prediction decode the subsequent block based on the determined motion vector.

As an example, motion compensation unit 164 may include the MVP corresponding to the top-left corner sub-block in a merge or AMVP candidate list, and may receive information indicating an entry in the merge or AMVP candidate list for the MVP corresponding to the top-left corner sub-block. Motion compensation unit 164 may determine a motion vector for the subsequent block based on the MVP corresponding to the top-left corner sub-block. For instance, for merge mode, motion compensation unit 164 may set the motion vector for the subsequent block equal to the MVP corresponding to the top-left corner sub-block. For AMVP mode, motion compensation unit 164 may add the MVP corresponding to the top-left corner sub-block with a received motion vector difference (MVD) to determine the motion vector for the subsequent block.

Figure 17:
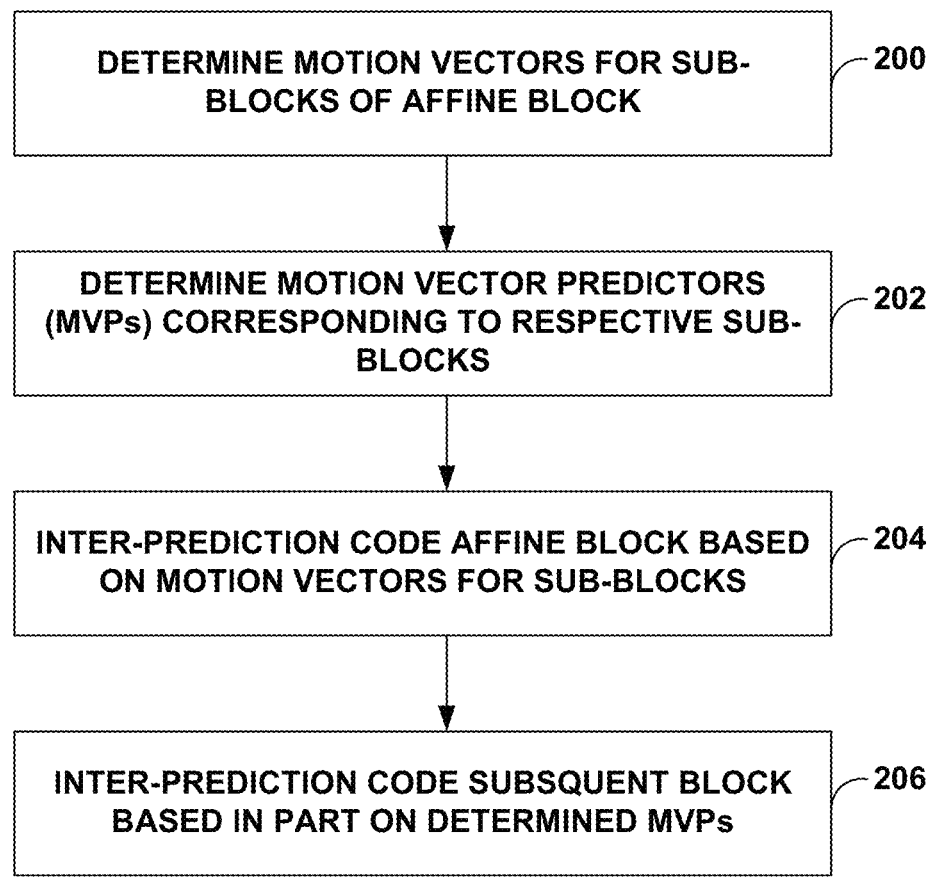
FIG. 17 is a flowchart illustrating an example method of coding video data.

FIG. 17 is a flowchart illustrating an example method of coding video data. For ease of description, FIG. 17 is described with respect to a video coder, which is a generic term to describe video encoder 20 and video decoder 30. The term "code" or "coding" is used to generically refer to "encode" or "encoding" or "decode" or "decoding."

The video coder, which includes at least one of fixed-function circuitry or programmable circuitry, may determine motion vectors for sub-blocks of an affine block (200). The motion vectors for the sub-blocks form a motion compensation prediction (MCP) motion vector field (MVF) for the sub-blocks. For example, the motion vectors of the sub-blocks identify predictive blocks as part of the motion compensation prediction that would occur on the sub-blocks of the affine block.

The video coder may determine motion vector predictors (MVPs) corresponding to respective sub-blocks (202). For example, the video coder may determine the MVPs corresponding to respective corner sub-blocks of the affine block are the same as motion vectors for the respective corner sub-blocks. In general, the video coder may determine the MVPs corresponding to respective sub-blocks to be the same as motion vectors for the respective sub-blocks. In this way, the motion vectors of the sub-blocks and the MVPs corresponding to the sub-blocks are unified (e.g., the same).

In one or more examples, the video coder may determine the motion vectors and the MVPs corresponding to the sub-blocks based on motion vectors for control points of the affine block. The control points of the affine block may be one or more of the corners of the affine block (e.g., top-left and top-right corners, or top-left, top-right, and bottom-left corners). In some examples, the control points of the affine block may be in the centers of one or more sub-blocks.

The video coder may determine the motion vectors of the control points in affine inter mode or affine merge mode. As one example, for affine inter mode, video decoder 30 may determine an entry into a candidate list with a plurality of motion vector sets, and determine motion vectors for control points of the affine block based on the entry into the candidate list. For affine inter mode, video encoder 20 may determine motion vectors for control points of the affine block, determine an entry into a candidate list with a plurality of motion vector sets based on the determined motion vectors, and signal information indicative of the entry into the candidate list.

For affine merge mode, video decoder 30 may determine another affine block (e.g., second affine block) that neighbors the current affine block (e.g., first affine block), and determine motion vectors for control points of the first affine block based on motion vectors for control points of the second affine block. For affine merge mode, video encoder 20 may also determine a second affine block that neighbors the first affine block. Video encoder 20 may determine that the first affine block is an affine merge mode predicted block. Accordingly, video encoder 20 may determine that motion vectors for control points of the first affine block are based on motion vectors for control points for the second affine block. In some examples, the control points of the second affine block may be at the corners of the second affine block. However, in some examples, the control points for the second affine block may be at centers of one or more sub-blocks of the second affine block.

There may be various ways in which the video coder may ensure that MVPs corresponding to respective sub-blocks are the same as motion vectors for the sub-blocks. The video coder may determine motion vectors for a plurality of control points of the affine block (e.g., in affine merge or affine inter mode). In one example, the video coder may interpolate motion vectors for the sub-blocks, including the corner sub-blocks, based on the motion vectors for the plurality of control points. In this example, the video coder may set the MVPs corresponding to the respective sub-blocks, including the corner sub-blocks, of the affine block equal to the interpolated motion vectors of the respective sub-blocks, including the corner sub-blocks. For example, the video coder may store the interpolated motion vectors and use the interpolated motion vectors as MVPs for subsequent blocks.

In another example, the video coder may set the motion vectors of one or more corner sub-blocks equal to motion vectors for the respective one or more control points. For the other sub-blocks (e.g., those not in the corner), the video coder may interpolate their motion vectors from the motion vectors for the control points. However, for the corner sub-blocks, the video coder may assign their motion vectors equal to the motion vector of the respective one or more control points.

For example, the video coder may set the motion vector for the top-left corner sub-block equal to the motion vector of the top-left control point, set the motion vector for the top-right corner sub-block equal to the motion vector of the top-right control point, and set the motion vector for the bottom-left corner sub-block equal to the motion vector of the bottom-left control point. For the bottom-right corner sub-block, the video coder may interpolate its motion vector. As another example, the video coder may set the motion vector for the top-left corner sub-block equal to the motion vector of the top-left control point, set the motion vector for the top-right corner sub-block equal to the motion vector of the top-right control point, set the motion vector for the bottom-left corner sub-block equal to the motion vector of the bottom-left control point, and set the motion vector for the bottom-right corner sub-block equal to the motion vector of the bottom-right control point.

In general, the video coder may set the motion vector of one or more corner sub-blocks equal to respective one or more motion vectors of control points. There may be various permutations and combinations. For example, the video coder may set the motion vector for the top-right corner sub-block equal to the motion vector of the top-right control point. For all other corner sub-blocks, the video coder may interpolate their motion vectors. Each of these various permutations and combinations are contemplated by this disclosure.

Moreover, the control point being on the corner of the affine block is one example, and the control point may be located elsewhere. For example, the video coder may determine motion vectors for control points of the affine block, where the control points include points at respective centers within one or more of the sub-blocks.

The video coder may inter-prediction code the affine block, as part of MCP, based on the motion vectors that from the MVF for the sub-blocks of the affine block (204). As one example, as part of MCP, video decoder 30 may inter-prediction decode the affine block by determining predictive blocks based on the motion vectors that form the MVF for the sub-blocks, receiving residual data for the affine block, and reconstructing the affine block based on the predictive blocks and the residual data. As part of MCP, video encoder 20 may inter-prediction encode the affine block by determining predictive blocks based on the motion vectors that form the MVF for the sub-blocks, determining residual data for the affine block based on a difference between the predictive blocks and the affine block, and signaling information indicative of the residual data.

The video coder may inter-prediction code a subsequent block based in part on the determined MVPs (206). For example, video decoder 30 may include at least one MVP of the MVPs in a merge or advanced motion vector prediction (AMVP) candidate list, select the MVP from the merge or AMVP candidate list based on received information indicating an entry in the merge or AMVP candidate list having the at least one MVP, determine a motion vector for the subsequent block based on the selected MVP, and inter-prediction decode the subsequent block based on the determined motion vector. Video encoder 20 may include at least one MVP of the MVPs in a merge or advanced motion vector prediction (AMVP) candidate list, determine a motion vector for the subsequent block, select the MVP from the merge or AMVP candidate list based on the determined motion vector, and signal information indicative of an entry of the selected MVP in the merge or AMVP candidate list.

Certain aspects of this disclosure have been described with respect to HEVC or extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
determining one or more affine parameters based on motion vectors for a plurality of control points of an affine block, wherein the one or more affine parameters comprise values used for scaling or offsetting coordinates of sub-blocks of the affine block for determining motion vectors for the sub-blocks;
determining the motion vectors for the sub-blocks of the affine block based on the determined one or more affine parameters, the motion vectors for the sub-blocks being a motion compensation prediction (MCP) motion vector field (MVF) for the sub-blocks;
storing the determined motion vectors for one or more of the sub-blocks of the affine block in a first buffer;
storing the determined one or more affine parameters of the affine block in a second buffer that is different than the first buffer; and
inter-prediction decoding the affine block, as part of MCP, based on the motion vectors stored in the first buffer.

2. The method of claim 1, wherein a bit-depth of the second buffer is a same bit-depth as a bit-depth of the first buffer.

3. The method of claim 1, wherein, for a 6-parameters affine model, the determined one or more affine parameters comprises one or more of: $v_{0x}$, $v_{0y}$, $v_{1x}$, $v_{1y}$, $v_{2x}$, $v_{2y}$, w, h, $(v_{1x}-v_{0x})$, $((v_{1x}-v_{0x})/w)$, $(v_{2x}-v_{0x})$, $((v_{2x}-v_{0x})/h)$, $(v_{1y}-v_{0y})$, $((v_{1y}-v_{0y})/w)$, $(v_{2y}-v_{0y})$, and $((v_{2y}-v_{0y})/h)$, wherein:
$v_{0x}$ is an x-coordinate of a first control point motion vector,
$v_{0y}$ is a y-coordinate of the first control point motion vector,
$v_{1x}$ is an x-coordinate of a second control point motion vector,
$v_{1y}$ is a y-coordinate of the second control point motion vector,
$v_{2x}$ is an x-coordinate of a third control point motion vector,
$v_{2y}$ is a y-coordinate of the third control point motion vector,
w is a width of the affine block, and
h is a height of the affine block.

4. The method of claim 1, wherein, for a 4-parameters affine model, the determined one or more affine parameters comprises one or more of: $v_{0x}$, $v_{0y}$, $v_{1x}$, $v_{1y}$, w, $(v_{1x}-v_{0x})$, $((v_{1x}-v_{0x})/w)$, $(v_{1y}-v_{0y})$, $((v_{1y}-v_{0y})/w)$, $(v_{1y}-v_{0y})$, $((v_{1y}-v_{0y})/w)$, $(v_{1x}-v_{0x})$, $((v_{1x}-v_{0x})/w)$, $((v_{1x}-v_{0x})/(w/4))$, and $((v_{1y}-v_{0y})/(w/4))$, wherein:

$v_{0x}$ is an x-coordinate of a first control point motion vector, $v_{0y}$ is a y-coordinate of the first control point motion vector, $v_{1x}$ is an x-coordinate of a second control point motion vector, $v_{1y}$ is a y-coordinate of the second control point motion vector, and w is a width of the affine block.

5. The method of claim 1, further comprising:

determining motion vector predictors (MVPs) corresponding to respective sub-blocks of the affine block, wherein the MVPs corresponding to respective sub-blocks refer to motion vector information that is used as respective predictors to determine a motion vector for a subsequent block, and wherein determining the MVPs includes setting MVPs corresponding to one or more corner sub-blocks of the affine block to be equal to determined motion vectors for the respective one or more corner sub-blocks; and inter-prediction decoding the subsequent block based in part on the determined MVPs.

6. The method of claim 5, wherein inter-prediction decoding the subsequent block comprises:

including at least one MVP of the MVPs in a merge or advanced motion vector prediction (AMVP) candidate list;

selecting one of the MVPs from the merge or AMVP candidate list based on received information indicating an entry in the merge or AMVP candidate list having the at least one MVP;

determining a motion vector for the subsequent block based on the selected MVP; and inter-prediction decoding the subsequent block based on the determined motion vector.

7. The method of claim 5, wherein determining the MVPs comprises setting MVPs corresponding to all respective sub-blocks, including the corner sub-blocks, of the affine block to be equal to determined motion vectors for the respective sub-blocks.

8. The method of claim 1, wherein inter-prediction decoding the affine block comprises:

determining predictive blocks based on the motion vectors for the sub-blocks;

receiving residual data for the affine block; and reconstructing the affine block based on the predictive blocks and the residual data.

9. A method of encoding video data, the method comprising:

determining one or more affine parameters based on motion vectors for a plurality of control points of an affine block, wherein the one or more affine parameters comprise values used for scaling or offsetting coordinates of sub-blocks of the affine block for determining motion vectors for the sub-blocks;

determining the motion vectors for the sub-blocks of the affine block based on the determined one or more affine parameters, the motion vectors for the sub-blocks being a motion compensation prediction (MCP) motion vector field (MVF) for the sub-blocks;

storing the determined motion vectors for one or more of the sub-blocks of the affine block in a first buffer;

storing the determined one or more affine parameters of the affine block in a second buffer that is different than the first buffer; and inter-prediction encoding the affine block, as part of MCP, based on the motion vectors stored in the first buffer.

10. The method of claim 9, wherein a bit-depth of the second buffer is a same bit-depth as a bit-depth of the first buffer.

11. The method of claim 9, wherein, for a 6-parameters affine model, the determined one or more affine parameters comprises one or more of: $v_{0x}$, $v_{0y}$, $v_{1x}$, $v_{1y}$, $v_{2x}$, $v_{2y}$, w, h, $(v_{1x}-v_{0x})$, $((v_{1x}-v_{0x})/w)$, $(v_{2x}-v_{0x})$, $((v_{2x}-v_{0x})/h)$, $(v_{1y}-v_{0y})$, $((v_{1y}-v_{0y})/w)$, $(v_{2y}-v_{0y})$, and $((v_{2y}-v_{0y})/h)$, wherein:

$v_{0x}$ is an x-coordinate of a first control point motion vector, $v_{0y}$ is a y-coordinate of the first control point motion vector, $v_{1x}$ is an x-coordinate of a second control point motion vector, $v_{1y}$ is a y-coordinate of the second control point motion vector, $v_{2x}$ is an x-coordinate of a third control point motion vector, $v_{2y}$ is a y-coordinate of the third control point motion vector, w is a width of the affine block, and h is a height of the affine block.

12. The method of claim 9, wherein, for a 4-parameters affine model, the determined one or more affine parameters comprises one or more of: $v_{0x}$, $v_{0y}$, $v_{1x}$, $v_{1y}$, w, $(v_{1x}-v_{0x})$, $((v_{1x}-v_{0x})/w)$, $(v_{1y}-v_{0y})$, $((v_{1y}-v_{0y})/w)$, $(v_{1y}-v_{0y})$, $((v_{1y}-v_{0y})/w)$, $(v_{1x}-v_{0x})$, $((v_{1x}-v_{0x})/w)$, $((v_{1x}-v_{0x})/(w/4))$, and $((v_{1y}-v_{0y})/(w/4))$, wherein:

$v_{0x}$ is an x-coordinate of a first control point motion vector, $v_{0y}$ is a y-coordinate of the first control point motion vector, $v_{1x}$ is an x-coordinate of a second control point motion vector, $v_{1y}$ is a y-coordinate of the second control point motion vector, and w is a width of the affine block.

13. The method of claim 9, further comprising:

determining motion vector predictors (MVPs) corresponding to respective sub-blocks of the affine block, wherein the MVPs corresponding to respective sub-blocks refer to motion vector information that is used as respective predictors to determine a motion vector for a subsequent block, wherein determining the MVPs includes setting MVPs corresponding to respective one or more corner sub-blocks of the affine block to be equal to determined motion vectors for the respective one or more corner sub-blocks; and inter-prediction encoding the subsequent block based in part on the determined MVPs.

14. The method of claim 13, wherein inter-prediction encoding the subsequent block comprises:

including at least one MVP of the MVPs in a merge or advanced motion vector prediction (AMVP) candidate list;

determining a motion vector for the subsequent block;

selecting one of the MVPs from the merge or AMVP candidate list based on the determined motion vector; and signaling information indicative of an entry of the selected MVP in the merge or AMVP candidate list.

15. The method of claim 13, wherein determining the MVPs comprises setting MVPs corresponding to all respective sub-blocks, including the corner sub-blocks, of the affine block to be equal to determined motion vectors for the respective sub-blocks.

16. The method of claim 9, wherein inter-prediction encoding the affine block comprises:
   determining predictive blocks based on the motion vectors for the sub-blocks;
   determining residual data for the affine block based on a difference between the predictive blocks and the affine block; and
   signaling information indicative of the residual data.

17. A device for coding video data, the device comprising:
   a first buffer;
   a second buffer different than the first buffer; and
   a video coder comprising at least one of fixed-function or programmable circuitry, wherein the video coder is configured to:
      determine one or more affine parameters based on motion vectors for a plurality of control points of an affine block, wherein the one or more affine parameters comprise values used for scaling or offsetting coordinates of sub-blocks of the affine block for determining motion vectors for the sub-blocks;
      determine the motion vectors for the sub-blocks of the affine block based on the determined one or more affine parameters, the motion vectors for the sub-blocks being a motion compensation prediction (MCP) motion vector field (MVF) for the sub-blocks;
      store the determined motion vectors for one or more of the sub-blocks of the affine block in the first buffer;
      store the determined one or more affine parameters of the affine block in the second buffer that is different than the first buffer; and
      inter-prediction code the affine block, as part of MCP, based on the motion vectors stored in the first buffer.

18. The device of claim 17, wherein a bit-depth of the second buffer is a same bit-depth as a bit-depth of the first buffer.

19. The device of claim 17, wherein, for a 6-parameters affine model, the determined one or more affine parameters comprises one or more of: $v_{0x}$, $v_{0y}$, $v_{1x}$, $v_{1y}$, $v_{2x}$, $v_{2y}$, w, h, $(v_{1x}-v_{0x})$, $((v_{1x}-v_{0x})/w)$, $(v_{2x}-v_{0x})$, $((v_{2x}-v_{0x})/h)$, $(v_{1y}-v_{0y})$, $((v_{1y}-v_{0y})/w)$, $(v_{2y}-v_{0y})$, and $((v_{2y}-v_{0y})/h)$, wherein:
   $v_{0x}$ is an x-coordinate of a first control point motion vector,
   $v_{0y}$ is a y-coordinate of the first control point motion vector,
   $v_{1x}$ is an x-coordinate of a second control point motion vector,
   $v_{1y}$ is a y-coordinate of the second control point motion vector,
   $v_{2x}$ is an x-coordinate of a third control point motion vector,
   $v_{2y}$ is a y-coordinate of the third control point motion vector,
   w is a width of the affine block, and
   h is a height of the affine block.

20. The device of claim 17, wherein, for a 4-parameters affine model, the determined one or more affine parameters comprises one or more of: $v_{0x}$, $v_{0y}$, $v_{1x}$, $v_{1y}$, w, $(v_{1x}-v_{0x})$, $((v_{1x}-v_{0x})/w)$, $(v_{1y}-v_{0y})$, $((v_{1y}-v_{0y})/w)$, $(v_{1y}-v_{0y})$, $((v_{1y}-v_{0y})/w)$, $(v_{1x}-v_{0x})$, $((v_{1x}-v_{0x})/w)$, $((v_{1x}-v_{0x})/(w/4))$, and $((v_{1y}-v_{0y})/(w/4))$, wherein:
   $v_{0x}$ is an x-coordinate of a first control point motion vector,
   $v_{0y}$ is a y-coordinate of the first control point motion vector,
   $v_{1x}$ is an x-coordinate of a second control point motion vector,
   $v_{1y}$ is a y-coordinate of the second control point motion vector, and
   w is a width of the affine block.

21. The device of claim 17, wherein the video coder is configured to:
   determine motion vector predictors (MVPs) corresponding to respective sub-blocks of the affine block, wherein the MVPs corresponding to respective sub-blocks refer to motion vector information that is used as respective predictors to determine a motion vector for a subsequent block, wherein to determine the MVPs, the video coder is configured to set MVPs corresponding to one or more corner sub-blocks of the affine block to be equal to determined motion vectors for the respective one or more corner sub-blocks; and
   inter-prediction code the subsequent block based in part on the determined MVPs.

22. The device of claim 21, wherein to determine the MVPs, the video coder is configured to determine that MVPs corresponding to all respective sub-blocks, including the corner sub-blocks, of the affine block are the same as motion vectors for the respective sub-blocks.

23. A non-transitory computer-readable storage medium storing instructions that when executed cause one or more processors to:
   determine one or more affine parameters based on motion vectors for a plurality of control points of an affine block, wherein the one or more affine parameters comprise values used for scaling or offsetting coordinates of sub-blocks of the affine block for determining motion vectors for the sub-blocks;
   determine the motion vectors for the sub-blocks of the affine block based on the determined one or more affine parameters, the motion vectors for the sub-blocks being a motion compensation prediction (MCP) motion vector field (MVF) for the sub-blocks;
   store the determined motion vectors for one or more of the sub-blocks of the affine block in a first buffer;
   store the determined one or more affine parameters of the affine block in a second buffer that is different than the first buffer; and
   inter-prediction code the affine block, as part of MCP, based on the motion vectors stored in the first buffer.

24. The computer-readable storage medium of claim 23, wherein a bit-depth of the second buffer is a same bit-depth as a bit-depth of the first buffer.

25. The computer-readable storage medium of claim 23, wherein, for a 6-parameters affine model, the determined one or more affine parameters comprises one or more of: $v_{0x}$, $v_{0y}$, $v_{1x}$, $v_{1y}$, $v_{2x}$, $v_{2y}$, w, h, $(v_{1x}-v_{0x})$, $((v_{1x}-v_{0x})/w)$, $(v_{2x}-v_{0x})$, $((v_{2x}-v_{0x})/h)$, $(v_{1y}-v_{0y})$, $((v_{1y}-v_{0y})/w)$, $(v_{2y}-v_{0y})$, and $((v_{2y}-v_{0y})/h)$, wherein:
   $v_{0x}$ is an x-coordinate of a first control point motion vector,
   $v_{0y}$ is a y-coordinate of the first control point motion vector,
   $v_{1x}$ is an x-coordinate of a second control point motion vector,
   $v_{1y}$ is a y-coordinate of the second control point motion vector,
   $v_{2x}$ is an x-coordinate of a third control point motion vector,
   $v_{2y}$ is a y-coordinate of the third control point motion vector,
   w is a width of the affine block, and
   h is a height of the affine block.

26. The computer-readable storage medium of claim 23, wherein, for a 4-parameters affine model, the determined one or more affine parameters comprises one or more of: $v_{0x}$, $v_{0y}$, $v_{1x}$, $v_{1y}$, $w$, $(v_{1x}-v_{0x})$, $((v_{1x}-v_{0x})/w)(v_{1y}-v_{0y})$, $((v_{1y}-v_{0y})/w)$, $(v_{1y}-v_{0y})$, $((v_{1y}-v_{0y})/w)$, $(v_{1x}-v_{0x})$, $((v_{1x}-v_{0x})/w)$, $((v_{1x}-v_{0x})/(w/4))$, and $((v_{1y}-v_{0y})/(w/4))$, wherein:

- $v_{0x}$ is an x-coordinate of a first control point motion vector,
- $v_{0y}$ is a y-coordinate of the first control point motion vector,
- $v_{1x}$ is an x-coordinate of a second control point motion vector,
- $v_{1y}$ is a y-coordinate of the second control point motion vector, and
- w is a width of the affine block.

* * * * *